(12) United States Patent
Patel et al.

(10) Patent No.: US 6,826,749 B2
(45) Date of Patent: Nov. 30, 2004

(54) JAVA HARDWARE ACCELERATOR USING THREAD MANAGER

(75) Inventors: Mukesh K. Patel, Fremont, CA (US); Udaykumar R. Raval, Santa Clara, CA (US); Harihar J. Vyas, San Jose, CA (US)

(73) Assignee: Nazomi Communications, Inc., Santa Clara, CA (US)

( * ) Notice: Subject to any disclaimer, the term of this patent is extended or adjusted under 35 U.S.C. 154(b) by 635 days.

(21) Appl. No.: 09/866,508

(22) Filed: May 25, 2001

(65) Prior Publication Data

US 2002/0019976 A1 Feb. 14, 2002

Related U.S. Application Data

(63) Continuation-in-part of application No. 09/687,777, filed on Oct. 13, 2000, which is a continuation-in-part of application No. 09/208,741, filed on Dec. 8, 1998.

(51) Int. Cl.[7] .................................................. G06F 9/45
(52) U.S. Cl. ........................ 717/148; 717/118; 717/147
(58) Field of Search ................................. 717/116, 118, 717/148, 127, 147, 165

(56) References Cited

U.S. PATENT DOCUMENTS

| | | | |
|---|---|---|---|
| 4,524,416 A | 6/1985 | Stanley et al. | |
| 4,587,612 A | 5/1986 | Fisk et al. | |
| 4,631,663 A | 12/1986 | Chilinski et al. | |
| 4,763,255 A | 8/1988 | Hopkins et al. | |
| 4,783,738 A | 11/1988 | Li et al. | |
| 4,860,191 A | 8/1989 | Nomura et al. | |
| 4,961,141 A | 10/1990 | Hopkins et al. | |
| 5,077,657 A | 12/1991 | Cooper et al. | |
| 5,113,522 A | 5/1992 | Dinwiddie, Jr. et al. | |
| 5,136,696 A | 8/1992 | Beckwith et al. | |

(List continued on next page.)

FOREIGN PATENT DOCUMENTS

EP    1197847 A2    4/2002

OTHER PUBLICATIONS

Zalzala et al., MTGP: A multithreaded Java tool for genetic programming applications, IEEE, pp 904–912, 1999.*
Bailey, "Achieving minimal and deterministic interrupt execuation in stack based processor architecture", IEEE pp 368–375, 2000.*

(List continued on next page.)

*Primary Examiner*—Anil Khatri
(74) *Attorney, Agent, or Firm*—Blakely, Sokoloff, Taylor & Zafman LLP

(57) ABSTRACT

A Java accelerator includes a hardware unit associated with the CPU portion, the hardware unit converting stack-based instructions, such as Java bytecodes, into register-based instructions such as the instructions which are native to the CPU. A thread lifetime unit in the hardware unit is used to maintain a count of the number of bytecodes to be executed while an active thread is loaded into the system. Once this count reaches zero or below, the operation of a/the thread in the system is stopped and the Java Virtual Machine loaded into the CPU portion in order to implement its thread manager. Additionally, a single step unit in the hardware unit allows the production of debugger indications after each stack-based instruction.

41 Claims, 23 Drawing Sheets

U.S. PATENT DOCUMENTS

| | | |
|---|---|---|
| 5,142,681 A | 8/1992 | Driscoll et al. |
| 5,163,139 A | 11/1992 | Haigh et al. |
| 5,193,180 A | 3/1993 | Hastings |
| 5,201,056 A | 4/1993 | Daniel et al. |
| 5,218,711 A | 6/1993 | Yoshida |
| 5,241,636 A | 8/1993 | Kohn |
| 5,313,614 A | 5/1994 | Goettelmann et al. |
| 5,333,296 A | 7/1994 | Bouchard et al. |
| 5,335,344 A | 8/1994 | Hastings |
| 5,355,460 A | 10/1994 | Eickemeyer et al. |
| 5,430,862 A | 7/1995 | Smith et al. |
| 5,481,684 A | 1/1996 | Richter et al. |
| 5,490,256 A | 2/1996 | Mooney et al. |
| 5,535,329 A | 7/1996 | Hastings |
| 5,542,059 A | 7/1996 | Blomgren |
| 5,574,927 A | 11/1996 | Scantlin |
| 5,577,233 A | 11/1996 | Goettelmann et al. |
| 5,619,666 A | 4/1997 | Coon et al. |
| 5,634,118 A | 5/1997 | Blomgren |
| 5,650,948 A | 7/1997 | Gafter |
| 5,659,703 A | 8/1997 | Moore et al. |
| 5,668,999 A | 9/1997 | Gosling |
| 5,692,170 A | 11/1997 | Isaman |
| 5,748,964 A | 5/1998 | Gosling |
| 5,761,477 A | 6/1998 | Wahbe et al. |
| 5,764,908 A | 6/1998 | Shoji et al. |
| 5,768,593 A | 6/1998 | Walters et al. |
| 5,774,868 A | 6/1998 | Cragun et al. |
| 5,778,178 A | 7/1998 | Arunachalam |
| 5,781,750 A | 7/1998 | Blomgren et al. |
| 5,784,584 A | 7/1998 | Moore et al. |
| 5,805,895 A | 9/1998 | Breternitz, Jr. et al. |
| 5,809,336 A | 9/1998 | Moore et al. |
| 5,838,165 A | 11/1998 | Chatter |
| 5,875,336 A | 2/1999 | Dichol et al. |
| 5,889,996 A | 3/1999 | Adams |
| 5,898,850 A | 4/1999 | Dickol et al. |
| 5,898,885 A | 4/1999 | Dickol et al. |
| 5,903,761 A | 5/1999 | Tyma |
| 5,905,895 A | 5/1999 | Halter |
| 5,923,892 A | 7/1999 | Levy |
| 5,925,123 A | 7/1999 | Tremblay et al. |
| 5,937,193 A | 8/1999 | Evoy |
| 5,953,741 A | 9/1999 | Evoy |
| 5,983,334 A | 11/1999 | Coon et al. |
| 5,999,731 A | 12/1999 | Yellin et al. |
| 6,021,273 A * | 2/2000 | Griesemer ................. 717/148 |
| 6,021,469 A | 2/2000 | Tremblay et al. |
| 6,026,485 A | 2/2000 | O'Connor et al. |
| 6,038,643 A | 3/2000 | Tremblay et al. |
| 6,065,108 A | 5/2000 | Tremblay et al. |
| 6,075,940 A | 6/2000 | Gosling |
| 6,081,665 A | 6/2000 | Nilsen |
| 6,108,768 A | 8/2000 | Koppala et al. |
| 6,110,226 A | 8/2000 | Bothner |
| 6,118,940 A | 9/2000 | Alexander, III et al. |
| 6,125,439 A | 9/2000 | Tremblay et al. |
| 6,131,144 A | 10/2000 | Koppala |
| 6,131,191 A | 10/2000 | Cierniak et al. |
| 6,139,199 A | 10/2000 | Rodriguez |
| 6,141,794 A | 10/2000 | Dice et al. |
| 6,158,048 A | 12/2000 | Lueh et al. |
| 6,167,488 A | 12/2000 | Koppala |
| 6,209,077 B1 | 3/2001 | Robertson et al. |
| 6,256,725 B1 * | 7/2001 | Batten et al. ................ 712/200 |
| 6,275,984 B1 * | 8/2001 | Morita ....................... 717/151 |
| 6,292,883 B1 | 9/2001 | Augusteijn et al. |
| 6,332,215 B1 * | 12/2001 | Patel et al. .................. 717/141 |
| 6,338,160 B1 * | 1/2002 | Patel et al. .................. 717/139 |
| 6,349,377 B1 | 2/2002 | Lindwer |
| 2002/0078115 A1 | 6/2002 | Poff et al. |

OTHER PUBLICATIONS

Kazi et al, Techniques for obtaining high performance in Java programs, ACM Computing Svy, vol. 32, No. 3, pp 213–240, Sep. 2000.*

"Sun says JAVA chips will vastly increase speed, reduce costs to run JAVA programs," *Interactive Daily*, downloaded from the Internet (Dec. 1996).

Andreas Krall, "Efficient JAVA VM Just–In–Time Compilation," IEEE 1998.

Debaere and Campenhout, "Interpretation and Instruction Path Coprocessing," ©1990 The MIT Press.

"SGI WebForce 02 is a one–stop Web authoring platform," InfoWorld, Jan. 20, 1997.

Krall, et al., "CACAO—A 64–bit Java VM just–in–time compiler," Concurrency: Practice and Experience, vol. 9 (11), pp. 1017–1030, Nov. 1997.

Miyoshi, et al., "Implementation and Evaluation of Real–Time Java Threads," IEEE, 1997, p. 166–175.

Berekovic et al., "Hardware Realization of a Java Virtual Machine For High Performance Multimedia Applications," IEEE, 1997, p. 479–488.

Watanabe et al., "Exploring Java Instruction/Thread Level Parallelism with Horizontal Multithreading," IEEE, 2001, p. 122–129.

Pang, et al., "Providing Soft Real–Time Qos Guarantees For Java Threads," ACM, 2001 p. 39–47.

Radhakrishnan et al., "Improving Java Performance Using Hardware Translation," ACM, 2001, p. 427–439.

* cited by examiner

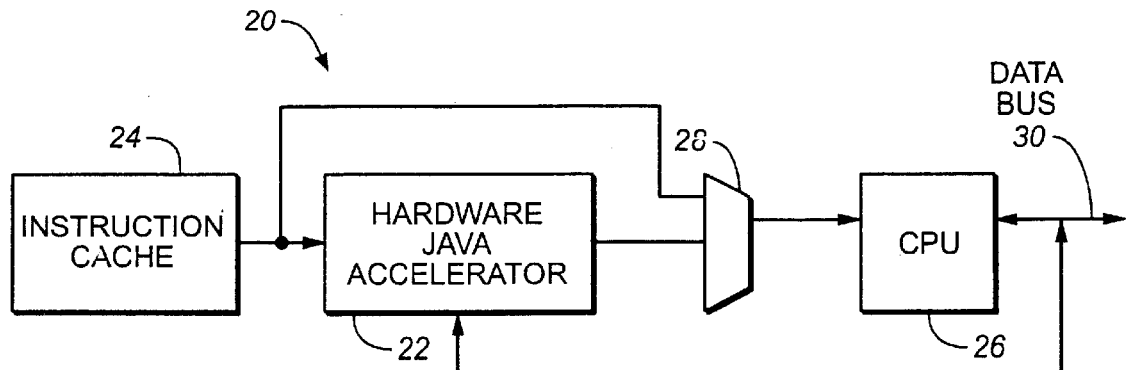
FIG._1
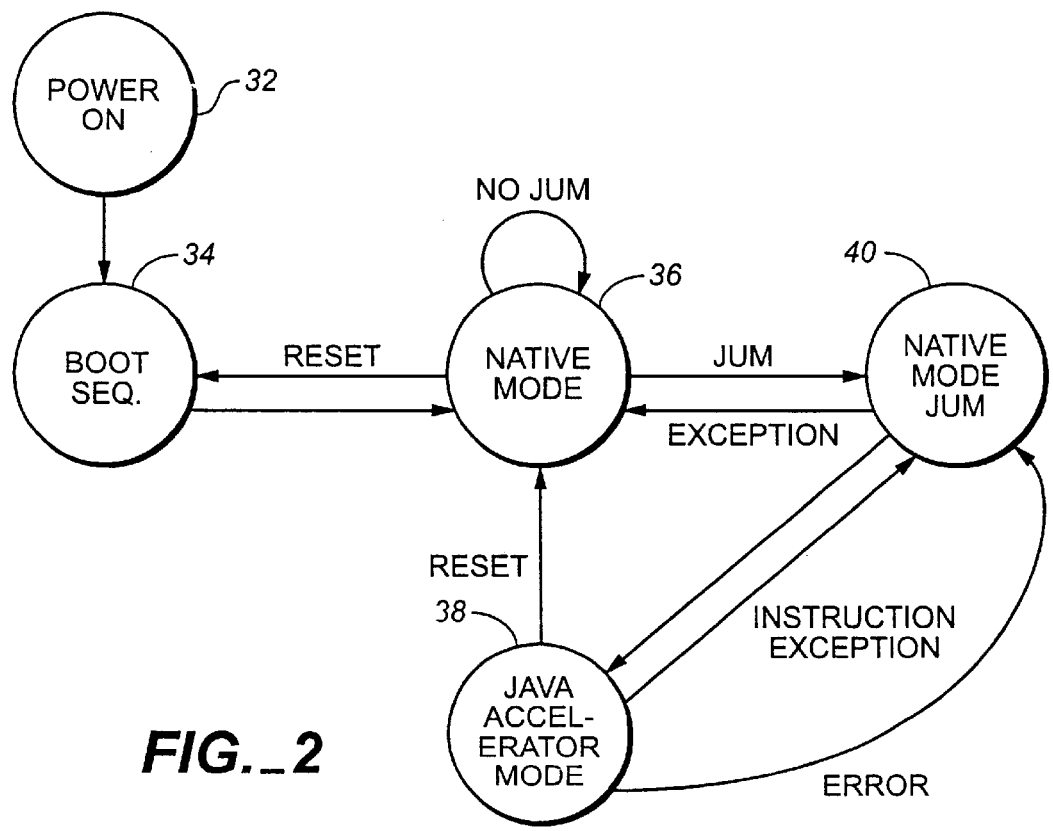
FIG._2

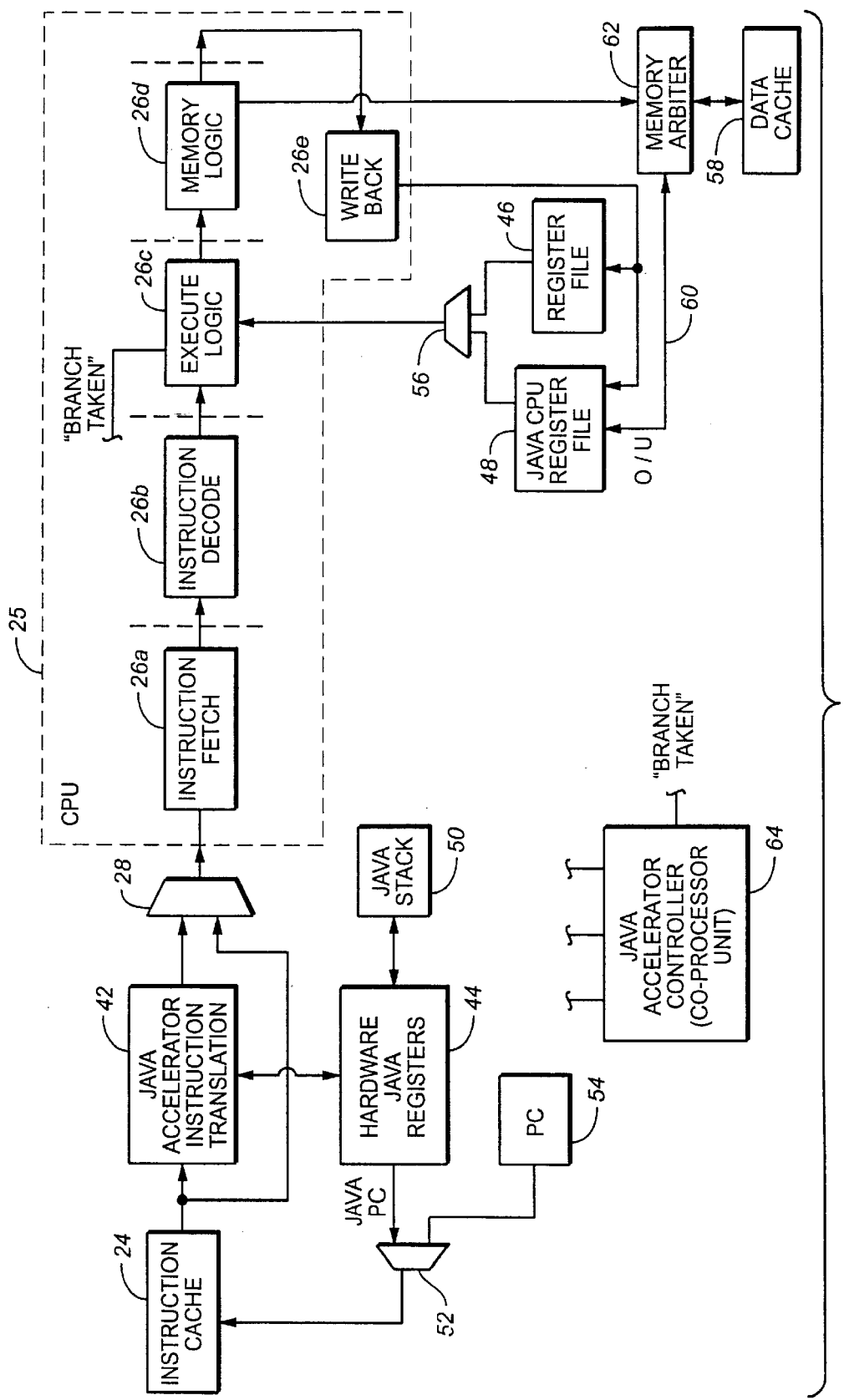
FIG._3

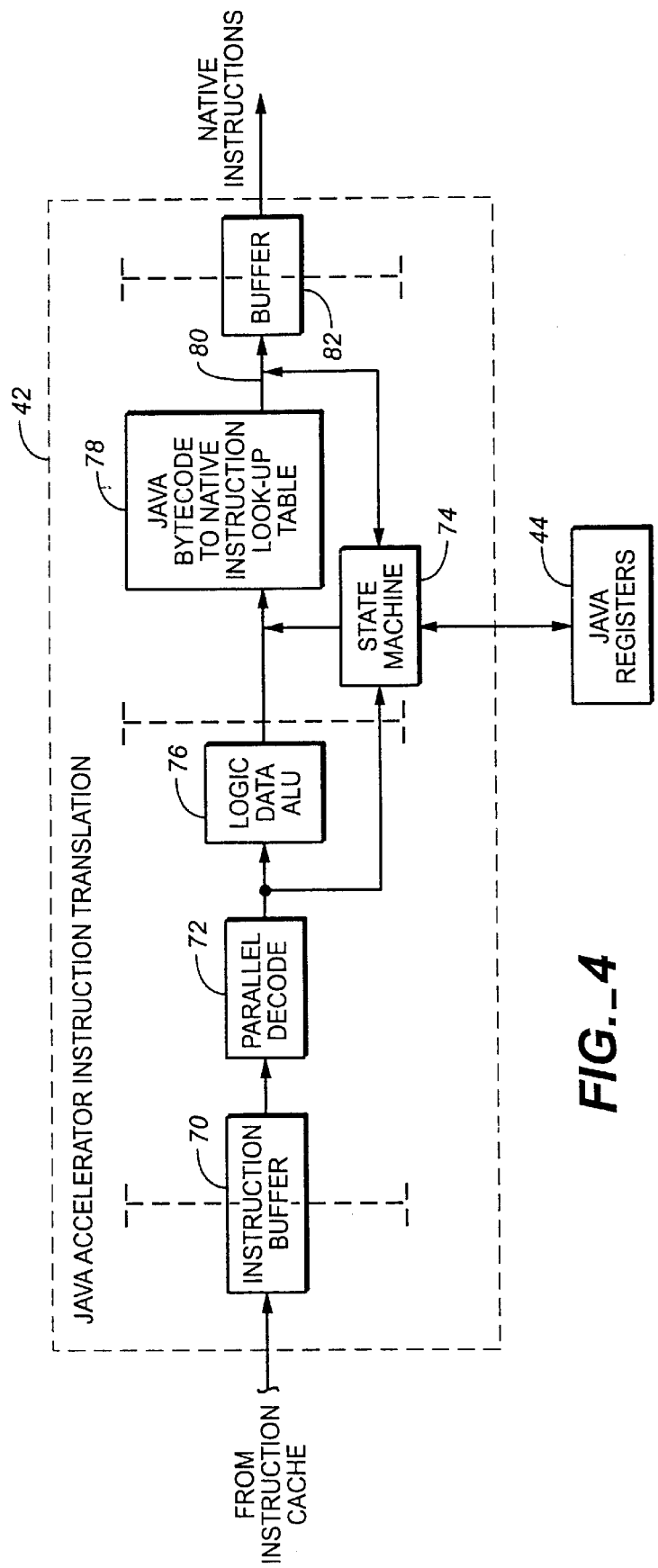
FIG._4

I. INSTRUCTION TRANSLATION

JAVA BYTECODE  NATIVE INSTRUCTION iadd                           ADD R1, R2

II. JAVA REGISTER

PC = VALUE A                   PC = VALUE A + 1
OPTOP = VALUE B    OPTOP = VALUE B - 1
  (R1)                          (R2)
VAR = VALUE C                  VAR = VALUE C

III. JAVA CPU REGISTER FILE

|  | | | | |
|---|---|---|---|---|
|  | R0 0001 |  | R0 0001 |
| CONTAINS VALUE → | R1 0150 | NOT A VALID STACK VALUE → | R1 0150 |
| OF TOP OF OPERAND STACK | R2 1210 | CONTAINS VALUE OF THE TOP OF OPERAND STACK → | R2 1360 |
|  | R3 0007 |  | R3 0007 |
|  | R4 0005 |  | R4 0005 |
|  | R5 0006 |  | R5 0006 |
| CONTAINS FIRST → | R6 1221 |  | R6 1221 |
| VARIABLE | R7 1361 |  | R7 1361 |

IV. MEMORY

OPTOP = VALUE B →   - 0150                                    - 0150
(VALUE B - 1) -   1210      OPTOP = VALUE B - 1 -  1360
                 - 0007                                    - 0007
                 - 0005                                    - 0005
                 - 0006                                    - 0006
                 - 0001                                    - 0001
                 - 4427                                    - 4427

VAR = VALUE C -  1221            VAR = VALUE C -  1221
              -  1361                          -  1361
              -  1101                          -  1101

FIG._5

I. INSTRUCTION TRANSLATION

JAVA BYTECODE iload_n
iadd

NATIVE INSTRUCTION

ADD R6, R1

II. JAVA REGISTER

PC = VALUE A
OPTOP = VALUE B
    (R1)
VAR = VALUE C

PC = VALUE A + 2
OPTOP = VALUE B
    (R1)
VAR = VALUE C

III. JAVA CPU REGISTER FILE

CONTAINS → R1  0150
VALUE OF   R2  1210
TOP OF     R3  0007
OPERAND STACK R4 0005
       R0  0001
       R5  0006
CONTAINS FIRST → R6 1221
VARIABLE    R7  1361

R0  0001
CONTAINS → R1  1371
VALUE OF   R2  1210
TOP OF     R3  0007
STACK      R4  0005
       R5  0006
CONTAINS → R6  1221
FIRST      R7  1361
VARIABLE

IV. MEMORY

OPTOP = VALUE B → - 0150
           - 1210
           - 0007
           - 0005
           - 0006
           - 0001
           - 4427

OPTOP = VALUE B - 1371
           - 1210
           - 0007
           - 0005
           - 0006
           - 0001
           - 4427

VAR = VALUE C - 1221
           - 1361
           - 1101

VAR = VALUE C - 1221
           - 1361
           - 1101

*FIG._6*

| Opcodes Mnemonic | Opcode xHH | Excep Gen |
|---|---|---|
| nop | 0x00 | |
| aconst_null | x01 | |
| iconst_m1 | x02 | |
| iconst_n(0-5) | x03 - x08 | |
| lconst_n(0-1) | x09 - x0a | |
| fconst_n(0-2) | x0c - x0d | |
| dconst_n(0-1) | x0e -x0f | |
| bipush | x10 | |
| sipush | x11 | |
| ldc | x12 | y |
| ldc_w | x13 | y |
| ldc2_w | x14 | y |
| iload | x15 | |
| lload | x16 | |
| fload | x17 | |
| dload | x18 | |
| aload | x19 | |
| iload_n(0-3) | x1a - x1d | |
| lload_n(0-3) | x1e - x21 | |
| fload_n(0-3) | x22 - x25 | |
| dload_n(0-3) | x26 - x29 | |
| aload_n(0-3) | x2a - x2d | |
| iaload | x2e | |
| laload | x2f | |
| faload | x30 | |
| daload | x31 | |
| aaload | x32 | |
| baload | x33 | |
| caload | x34 | |
| saload | x35 | |
| istore | x36 | |
| lstore | x37 | |
| fstore | x38 | |
| dstroe | x39 | |
| astroe | x3a | |
| istore_n(0-3) | x3b - x3e | |
| lstore_n(0-3) | x3f - x42 | |
| fstore_n(0-3) | x43 - x46 | |
| dstore_n(0-3) | x47 - x4a | |
| astore_n(0-3) | x4b - x4e | |
| iastore | x4f | |
| lastore | x50 | |
| fastroe | x51 | |
| dastore | x52 | |
| bastore | x53 | |
| aastore | x54 | |
| castroe | x55 | |
| sastore | x56 | |

*FIG._7A*

| | | |
|---|---|---|
| pop | x57 | |
| pop2 | x58 | |
| dup | x59 | |
| dup_x1 | x5a | |
| dup_x2 | x5b | |
| dup2 | x5c | |
| dup2_x1 | x5d | |
| dup2_x2 | x5e | |
| swap | x5f | |
| iadd | x60 | |
| ladd | x61 | |
| fadd | x62 | y |
| dadd | x63 | y |
| isub | x64 | |
| lsub | x65 | |
| fsub | x66 | y |
| dsub | x67 | y |
| imul | x68 | |
| lmul | x69 | |
| fmul | x6a | y |
| dmul | x6b | y |
| idiv | x6c | y |
| ldiv | x6d | y |
| fdiv | x6e | y |
| ddiv | x6f | y |
| irem | x70 | y |
| lrem | x71 | y |
| frem | x72 | y |
| drem | x73 | y |
| ineg | x74 | |
| lneg | x75 | |
| fneg | x76 | y |
| dneg | x77 | y |
| ishl | x78 | |
| lshl | x79 | |
| ishr | x7a | |
| lshr | x7b | |
| iushr | x7c | |
| lushr | x7d | |
| iand | x7e | |
| land | x7f | |
| ior | x80 | |
| lor | x81 | |
| ixor | x82 | |
| lxor | x83 | |
| iinc | x84 | |
| i2l | x85 | y |
| i2f | x86 | y |
| i2d | x87 | y |
| l2i | x88 | y |
| l2f | x89 | y |
| l2d | x8a | y |

*FIG._7B*

| | | |
|---|---|---|
| f2i | x8b | y |
| f2l | x8c | y |
| f2d | x8d | y |
| d2i | x8e | y |
| d2l | x8f | y |
| d2f | x90 | y |
| i2b | x91 | |
| i2c | x92 | |
| i2s | x93 | |
| lcmp | x94 | y |
| fcmpl | x95 | y |
| fcmpg | x96 | y |
| dcmpl | x97 | y |
| dcmpg | x98 | y |
| ifeq | x99 | |
| ifne | x9a | |
| iflt | x9b | |
| ifge | x9c | |
| ifgt | x9d | |
| ifle | x9e | |
| if_icmpeq | x9f | |
| if_icmpne | xa0 | |
| if_icmplt | xa1 | |
| if_acmpge | xa2 | |
| if_cmpgt | xa3 | |
| if_icmple | xa4 | |
| if_acmpeq | xa5 | |
| if_acmpne | xa6 | |
| goto | xa7 | |
| jsr | xa8 | |
| ret | xa9 | |
| tableswitch | xaa | y |
| lookupswitch | xab | y |
| ireturn | xac | |
| lreturn | xad | |
| freturn | xae | |
| dreturn | xaf | |
| areturn | xb0 | |
| return | xb1 | |
| getstatic | xb2 | y |
| putstatic | xb3 | y |
| getfield | xb4 | y |
| putfield | xb5 | y |
| invokevirtual | xb6 | y |
| invokespecial | xb7 | y |
| invokestatic | xb8 | y |
| invokeinterface | xb9 | y |
| xxunsedxxx | xba | y |
| new | xbb | y |
| newarray | xbc | y |
| anewarray | xbd | y |
| arraylength | xbe | y |

FIG._7C

| | | |
|---|---|---|
| athrow | xbf | y |
| checkcast | xc0 | y |
| instanceof | xc1 | y |
| monitorenter | xc2 | y |
| monitorexit | xc3 | y |
| wide | xc4 | y |
| multianewarray | xc5 | y |
| ifnull | xc6 | y |
| ifnonnull | xc7 | y |
| goto_w | xc8 | |
| jsr_w | xc9 | |
| | | |
| ldc_quick | xcb | y |
| ldc_w_quick | xcc | y |
| ldc2_w_quick | xcd | y |
| getfield_quick | xce | y |
| putfield_quick | xcf | y |
| getfield2_quick | xd0 | y |
| putfield2_quick | xd1 | y |
| getstatic_quick | xd2 | y |
| putstatic_quick | xd3 | y |
| gtestatic2_quick | xd4 | y |
| putstatic2_quick | xd5 | y |
| invokevirtual_quick | xd6 | y |
| invokenonvirtual_quick | xd7 | y |
| invokesuper_quick | xd8 | y |
| invokestatic_quick | xd9 | y |
| invokeinterface_quick | xda | y |
| invokevirtualobject_quick | xdb | y |
| new_quick | xdc | y |
| anewarray_quick | xde | y |
| multinewarray_quick | xdf | y |
| checkcast_quick | xe0 | y |
| instanceof_quick | xe1 | y |
| invokevirtual_quick_w | xe2 | y |
| getfield_quick_w | xe3 | y |
| putfield_quick_w | xe4 | y |
| | | |
| breakpoint | xca | y |
| impdep1 | xfe | y |
| impdep2 | xff | y |

*FIG._7D*

| FIG. 23a | FIG. 23b |

JAVA HARDWARE ACCELERATOR USING THREAD MANAGER

RELATED APPLICATIONS

The present application is a continuation-in-part of the patent application Ser. No. 09/687,777 of Mukesh K. Patel entitled "JAVA Hardware Accelerator Using Microcode Engine" filed Oct. 13, 2000; which is a continuation-in-part of the application Ser. No. 09/208,741 of Mukesh K. Patel et al. entitled "Java Virtual Machine Hardware for RISC and CISC Processors," filed Dec. 8, 1998.

BACKGROUND OF THE INVENTION

Java™ is an object-orientated programming language developed by Sun Microsystems. The Java language is small, simple and portable across platforms and operating systems, both at the source and at the binary level. This makes the Java programming language very popular on the Internet.

Java's platform independence and code compaction are the most significant advantages of Java over conventional programming languages. In conventional programming languages, the source code of a program is sent to a compiler which translates the program into machine code or processor instructions. The processor instructions are native to the system's processor. If the code is compiled on an Intel-based system, the resulting program will only run on other Intel-based systems. If it is desired to run the program on another system, the user must go back to the original source code, obtain a compiler for the new processor, and recompile the program into the machine code specific to that other processor.

Java operates differently. The Java compiler takes a Java program and, instead of generating machine code for a particular processor, generates bytecodes. Bytecodes are instructions that look like machine code, but aren't specific to any processor. To execute a Java program, a bytecode interpreter takes the Java bytecode converts them to equivalent native processor instructions and executes the Java program. The Java bytecode interpreter is one component of the Java Virtual Machine.

Having the Java programs in bytecode form means that instead of being specific to any one system, the programs can run on any platform and any operating system as long a Java Virtual Machine is available. This allows a binary bytecode file to be executable across platforms.

The disadvantage of using bytecodes is execution speed. System specific programs that run directly on the hardware from which they are compiled, run significantly faster that Java bytecodes, which must be processed by the Java Virtual Machine. The processor must both convert the Java bytecodes into native instructions in the Java Virtual Machine and execute the native instructions.

One way to speed up the Java Virtual Machine is by techniques such as the "Just in Time" (JIT) interpreter, and even faster interpreters known as "Hot Spot JITs" interpreters. The JIT versions all result in a JIT compile overhead to generate native processor instructions. These JIT interpreters also result in additional memory overhead.

The slow execution speed of Java and overhead of JIT interpreters have made it difficult for consumer appliances requiring local-cost solutions with minimal memory usage and low energy consumption to run Java programs. The performance requirements for existing processors using the fastest JITs more than double to support running the Java Virtual Machine in software. The processor performance requirements could be met by employing superscalar processor architectures or by increasing the processor clock frequency. In both cases, the power requirements are dramatically increased. The memory bloat that results from JIT techniques, also goes against the consumer application requirements of low cost and low power.

The Java Virtual Machine has two options to support multi-threaded execution of Java programs: Native threads (one to one threads), which use the operating systems support for multi-threading, and Green threads (many to one threads) which are managed entirely within the Java Virtual Machine entirely outside the operating system purview. The implementation of Green threads is done in one of two ways; in the first a thread gets control of the Java Virtual Machine until it gives it up, this type of threading requires that all threads be "well behaved" i.e. they give up control at various point in their execution if there is any other work waiting. The second approach lets each thread execute a number of bytecodes then the Java Virtual Machine switches to another thread if one is waiting, i.e. the thread doesn't need to be "well behaved".

It is desired to have an improved system for implementing Java programs that provides a low-cost solution for running Java programs for consumer appliances.

SUMMARY OF THE INVENTION

The present invention comprises a thread lifetime unit in the hardware unit of a Java hardware accelerator system. The thread lifetime unit keeps track of when the current thread should halt processing in the system. Some implementation of green threads allocates to each thread a number of bytecodes to execute. The thread lifetime unit allows hardware unit to keep track of the number of bytecodes remaining in the active thread.

The present invention preferably uses a register to store the number of bytecodes to run for each thread. This value can be loaded into a counter which is decremented as instructions are issued. When the decrementing counter reaches zero or a negative value, the hardware accelerator passes control to the thread manager portion of Java Virtual Machine. In one preferred embodiment, the values in the CPU register file are cleared and written out to the memory. These include any operand stack values stored in the register file and the like. When the transfer of control is given to the Java Virtual Machine, the Java Virtual Machine is loaded into the CPU which loads into the system. In one embodiment, once the thread bytecode count reaches zero or below, the hardware accelerator implements microcode that causes the storing of the value stored in the CPU register file and the loading of the Java Virtual Machine.

In one embodiment, a single step-unit of the hardware unit allows for the production of debugger indications along bytecode boundaries. In one embodiment, a debugger indication, such as a soft interrupt, is produced after each group of register-based instruction(s) translated from a single bytecode. Instruction level parallelism is can be inhibited during single-step operations. Preferably, debugger indications are also inserted after a jump in the CPU program counter.

BRIEF DESCRIPTION OF THE DRAWINGS

The present invention may be further understood from the following description in conjunction with the drawings.

FIG. 1 is a diagram of the system of the grandparent invention including a hardware Java accelerator.

FIG. 2 is a diagram illustrating the use of the hardware Java accelerator of the grandparent invention.

FIG. 3 is a diagram illustrating some the details of a Java hardware accelerator of one embodiment of the grandparent invention.

FIG. 4 is a diagram illustrating the details of one embodiment of a Java accelerator instruction translation in the system of the grandparent invention.

FIG. 5 is a diagram illustration the instruction translation operation of one embodiment of the grandparent invention.

FIG. 6 is a diagram illustrating the instruction translation system of one embodiment of the grandparent invention using instruction level parallelism.

FIG. 7 is a table of exception bytecodes for one embodiment of the grandparent invention.

DETAILED DESCRIPTION OF THE PREFERRED EMBODIMENTS

Figure 8:
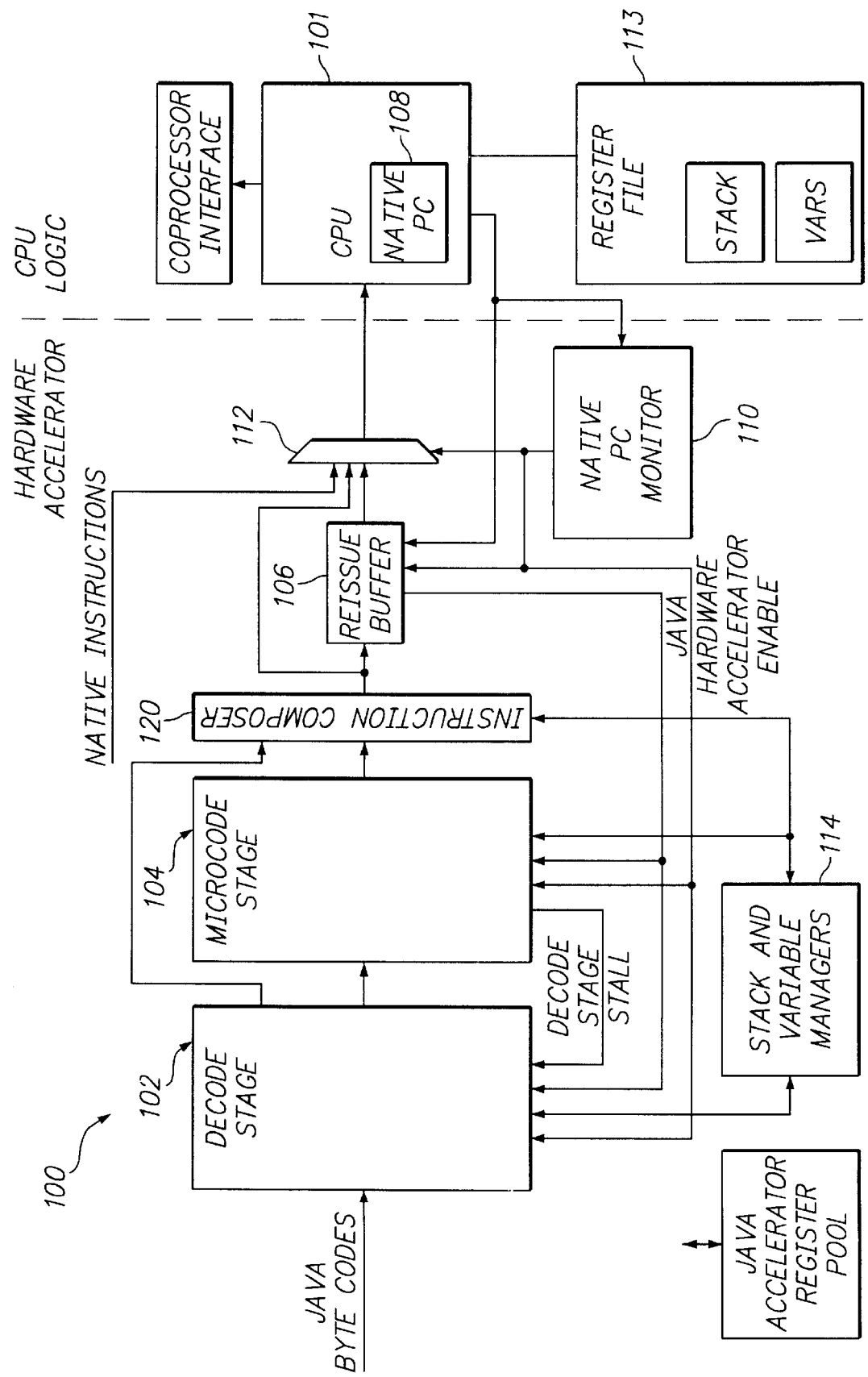
FIG. 8 is a diagram of one embodiment of a hardware accelerator used with one embodiment of the parent invention.

FIGS. 1–7 illustrate the operation of the grandparent application.

FIG. 1 is a diagram of the system 20 showing the use of a hardware Java accelerator 22 in conjunction with a central processing unit 26. The Java hardware accelerator 22 allows part of the Java Virtual Machine to be implemented in hardware. This hardware implementation speeds up the processing of the Java bytecodes. In particular, in a preferred embodiment, the translation of the Java bytecodes into native processor instructions is at least partially done in the hardware Java accelerator 22. This translation has been part of a bottleneck in the Java Virtual Machine when implemented in software. In FIG. 1, instructions from the instruction cache 24 or other memory is supplied to the hardware Java accelerator 22. If these instruction are Java bytecode, the hardware Java accelerator 22 can convert these bytecodes into native processor instruction which are supplied through the multiplexer 28 to the CPU. If a non-Java code is used, the hardware accelerator can be by-passed using the multiplexer 26. The Java stack includes the frame, the operand stack, the variables, etc.

The Java hardware accelerator can do some or all of the following tasks:

1. Java bytecode decode;
2. identifying and encoding instruction level parallelism (ILP), wherever possible;
3. translating bytecodes to native instructions;
4. managing the Java stack on a register file associated with the CPU or as a separate stack;
5. generating exceptions on instructions on predetermined Java bytecodes;
6. switching to native CPU operation when native CPU code is provided;
7. performing bounds checking on array instructions; and
8. managing the variables on the register file associated with the CPU.

In a preferred embodiment, the Java Virtual Machine functions of bytecode interpreter, Java register, and Java stack are implemented in the hardware Java accelerator. The garbage collection heap and constant pool area can be maintained in normal memory and accessed through normal memory referencing. In one embodiment, these functions are accelerated in hardware, e.g. write barrier.

The major advantages of the Java hardware accelerator is to increase the speed in which the Java Virtual Machine operates, and allow existing native language legacy applications, software base, and development tools to be used. A dedicated microprocessor in which the Java bytecodes were the native instructions would not have access to those legacy applications.

Although the Java hardware accelerator is shown in FIG. 1 as separate from the central processing unit, the Java hardware accelerator can be incorporated into a central processing unit. In that case, the central processing unit has a Java hardware accelerator subunit to translate Java bytecode into the native instructions operated on by the main portion of the CPU.

FIG. 2 is a state machine diagram that shows the operation of one embodiment of the parent invention. Block 32 is the power-on state. During power-on, the multiplexer 28 is set to bypass the Java hardware accelerator. In block 34, the native instruction boot-up sequence is run. Block 36 shows the system in the native mode executing native instructions and by-passing the Java hardware accelerator.

In block 38, the system switches to the Java hardware accelerator mode. In the Java hardware accelerator mode, Java bytecode is transferred to the Java hardware accelerator 22, converted into native instructions then sent to the CPU for operation.

The Java accelerator mode can produce exceptions at certain Java bytecodes. These bytecodes are not processed by the hardware accelerator 22 but are processed in the CPU 26. As shown in block 40, the system operates in the native mode but the Java Virtual Machine is implemented in the accelerator which does the bytecode translation and handles the exception created in the Java accelerator mode.

The longer and more complicated bytecodes that are difficult to handle in hardware can be selected to produce the exceptions. FIG. 7 is a table showing one possible list of bytecodes which can cause exceptions in a preferred embodiment.

FIG. 3 is a diagram illustrating details of one embodiment of the Java hardware accelerator of the parent invention. The Java hardware accelerator includes Java accelerator instruction translation hardware 42. The instruction translation Unit 42 is used to convert Java bytecodes to native instructions. One embodiment of the Java accelerator instruction translation hardware 42 is described in more detail below with respect to FIG. 4. This instruction translation hardware 42 uses data stored in hardware Java registers 44. The hardware Java Registers store the Java Registers defined in the Java Virtual Machine. The Java Registers contain the state of the Java Virtual Machine, affect its operation, and are updated at runtime. The Java registers in the Java Virtual Machine include the PC, the program counter indicating what bytecode is being executed; Optop, a pointer to the top of the operand stack; Frame, a pointer to the execution environment of the current method; and Java variables (Vars), a pointer to the first local variable available of the currently executing method. The virtual machine defines these registers to be a single 32-bit word wide. The Java registers are also stored in the Java stack which can be implemented as the hardware Java stack 50 or the Java stack can be stored into the CPU associated register file.

In a preferred embodiment, the hardware Java registers 44 can include additional registers for the use of the instruction translation hardware 42. These registers can include a register indicating a switch to native instructions configuration and control registers and a register indicating the version number of the system.

The Java PC can be used to obtain bytecode instructions from the instruction cache 24 or memory. In one embodiment the Java PC is multiplexed with the normal program counter 54 of the central processing unit 26 in multiplexer 52. The normal PC 54 is not used during the operation of the Java hardware bytecode translation. In another embodiment, the normal program counter 54 is used as the Java program counter.

The Java registers are a part of the Java Virtual Machine and should not be confused with the general registers 46 or 48 which are operated upon by the central processing unit 26. In one embodiment, the system uses the traditional CPU register file 46 as well as a Java CPU register file 48. When native code is being operated upon the multiplexer 56 connects the conventional register file 46 to the execution logic 26c of the CPU 26. When the Java hardware accelerator is active, the Java CPU register file 48 substitutes for the conventional CPU register file 46. In another embodiment, the conventional CPU register file 46 is used.

As described below with respect to FIGS. 3 and 4, the Java CPU register file 48, or in an alternate embodiment the conventional CPU register file 46, can be used to store portions of the operand stack and some of the variables. In this way, the native register-based instructions from the Java accelerator instruction translator 42 can operate upon the operand stack and variable values stored in the Java CPU register file 48, or the values stored in the conventional CPU register file 46. Data can be written in and out of the Java CPU register file 48 from the data cache or other memory 58 through the overflow/underflow line 60 connected to the memory arbiter 62 as well as issued load/store instructions. The overflow/underflow transfer of data to and from the memory can be done concurrently with the CPU operation. Alternately, the overflow/underflow transfer can be done explicitly while the CPU is not operating. The overflow/ underflow bus 60 can be implemented as a tri-state bus or as two separate buses to read data in and write data out of the register file when the Java stack overflows or underflows.

The register files for the CPU could alternately be implemented as a single register file with native instructions used to manipulate the loading of operand stack and variable values to and from memory. Alternately, multiple Java CPU register files could be used: one register file for variable values, another register file for the operand stack values, and another register file for the Java frame stack holding the method environment information.

The Java accelerator controller (co-processing unit) 64 can be used to control the hardware Java accelerator, read in and out from the hardware Java registers 44 and Java stack 50, and flush the Java accelerator instruction translation pipeline upon a "branch taken" signal from the CPU execute logic 26c.

The CPU 26 is divided into pipeline stages including the instruction fetch 26a, instruction decode 26b, execute logic 26c, memory access logic 26d, and writeback logic 26e. The execute logic 26c executes the native instructions and thus can determine whether a branch instruction is taken and issue the "branch taken" signal. In one embodiment, the execute logic 26c monitors addresses for detecting branches.

FIG. 4 illustrates an embodiment of a Java accelerator instruction translator which can be used with the parent invention. The instruction buffer 70 stores the bytecode instructions from the instruction cache. The bytecodes are sent to a parallel decode unit 72 which decodes multiple bytecodes at the same time. Multiple bytecodes are processed concurrently in order to allow for instruction level parallelism. That is, multiple bytecodes may be converted into a lesser number of native instructions.

The decoded bytecodes are sent to a state machine unit 74 and Arithmetic Logic Unit (ALU) 76. The ALU 76 is provided to rearrange the bytecode instructions to make them easier to be operated on by the state machine 74 and perform various arithmetic functions including computing memory references. The state machine 74 converts the bytecodes into native instructions using the lookup table 78. Thus, the state machine 74 provides an address which indicates the location of the desired native instruction in the microcode look-up table 78 . Counters are maintained to keep a count of how many entries have been placed on the operand stack, as well as to keep track of and update the top of the operand stack in memory and in the register file. In a preferred embodiment, the output of the microcode look-up table 78 is augmented with indications of the registers to be operated on in the native CPU register file at line 80. The register indications are from the counters and interpreted from bytecodes. To accomplish this, it is necessary to have a hardware indication of which operands and variables are in which entries in the register file. Native Instructions are composed on this basis. Alternately, these register indications can be sent directly to the Java CPU register file 48 shown in FIG. 3.

The state machine 74 has access to the Java registers in 44 as well as an indication of the arrangement of the stack and variables in the Java CPU register file 48 or in the conventional CPU register file 46. The buffer 82 supplies the translated native instructions to the CPU.

The operation of the Java hardware accelerator of one embodiment of the parent invention is illustrated in FIGS. 5 and 6. FIG. 5, section I shows the instruction translation of the Java bytecode. The Java bytecode corresponding to the mnemonic iadd is interpreted by the Java Virtual Machine as an integer operation taking the top two values of the operand stack, adding them together and pushing the result on top of the operand stack. The Java translating machine translates the Java bytecode into a native instruction such as the instruction ADD R1, R2. This is an instruction native to the CPU indicating the adding of value in register R1 to the value in register R2 and the storing of this result in register R2. R1 and R2 are the top two entries in the operand stack.

As shown in FIG. 5, section II, the Java register includes a PC value of "Value A" that is incremented to "Value A+1". The Optop value changes from "Value B" to "Value B−1" to indicate that the top of the operand stack is at a new location. The Vars base value which points to the start of the variable list is not modified. In FIG. 5, section III, the contents of a native CPU register file or a Java CPU register file, 48 in FIG. 3, is shown. The Java CPU register file starts off with registers R0–R5 containing operand stack values and registers R6–R7 containing variable values. Before the operation of the native instruction, register R1 contains the top value of the operand stack. Register R6 contains the first variable. Hardware is used to detect the availability of the Vars in the register file. If the Var is not available, the hardware in conjunction with microcode issue load instructions to the native CPU. Once the value of a Var has been updated in the RF, that entry is marked as being modified so when doing method calls, only the updated Vars in memory are written back to memory. This results in significantly higher performance methods. After the execution of the native instruction, register R2 now contains the top value of the operand stack. Register R1 no longer contains a valid operand stack value and is available to be overwritten by a operand stack value.

FIG. 5, section IV, shows the memory locations of the operand stack and variables which can be stored in the data cache 58 or in main memory. For convenience, the memory is illustrated without illustrating any virtual memory scheme. Before the native instruction executes, the address of the top of the operand stack, Optop, is "Value B". After the native instruction executes, the address of the top of the operand stack is "Value B−1" containing the result of the native instruction. Note that the operand stack value "4427" can be written into register R1 across the overflow/underflow line 60. Upon a switch back to the native mode, the data in the Java CPU register file 48 should be written to the data memory.

Consistency must be maintained between the Hardware Java Registers 44, the Java CPU register file 48 and the data memory. The CPU 26 and Java Accelerator Instruction Translation Unit 42 are pipelined and any changes to the hardware java registers 44 and changes to the control information for the Java CPU register file 48 must be able to be undone upon a "branch taken" signal. The system preferably uses buffers (not shown) to ensure this consistency. Additionally, the Java instruction translation must be done so as to avoid pipeline hazards in the instruction translation unit and CPU.

FIG. 6 is a diagram illustrating the operation of instruction level parallelism with the parent invention. In FIG. 6 the Java bytecodes iload_n and iadd are converted by the Java bytecode translator to the single native instruction ADD R6, R1. In the Java Virtual Machine, iload_n pushes the top local variable indicated by the Java register Var onto the operand stack.

In the parent invention the Java hardware translator can combine the iload_n and iadd bytecode into a single native instruction. As shown in FIG. 6, section II, the Java Register, PC, is updated from "Value A" to "Value A+2". The Optop value remains "value B". The value Var remains at "value C".

As shown in FIG. 6, section III, after the native instruction ADD R6, R1 executes the value of the first local variable stored in register R6, "1221", is added to the value of the top of the operand stack contained in register R1 and the result stored in register R1. In FIG. 6, section IV, the Optop value does not change but the value in the top of the register contains the result of the ADD instruction, 1371. This example shows the present invention operating with a native CPU supporting only two operands. The invention can also support three operands and Very Long Instruction Word (VLIW) CPU's.

For some byte codes such as SiPush, BiPush, etc., the present invention makes available sign extended data for the immediate field of the native instruction being composed (120) by the hardware and microcode. This data can alternatively be read as a coprocessor register. The coprocessor register read/write instruction can be issued by hardware accelerator as outlined in the present invention. Additionally, the microcode has several fields that aid in composing the native instruction.

The Java hardware accelerator of the parent invention is particularly well suited to a embedded solution in which the hardware accelerator is positioned on the same chip as the existing CPU design. This allows the prior existing software base and development tools for legacy applications to be used. In addition, the architecture of the present embodiment is scalable to fit a variety of applications ranging from smart cards to desktop solutions. This scalability is implemented in the Java accelerator instruction translation unit of FIG. 4. For example, the lookup table 78 and state machine 74 can be modified for a variety of different CPU architectures. These CPU architectures include reduced instruction set computer (RISC) architectures as well as complex instruction set computer (CISC) architectures. The present invention can also be used with superscalar CPUs or very long instruction word (VLIW) computers.

FIGS. 8–20 illustrate the operation of the parent invention. FIG. 8 is a diagram that shows a system 100 of one embodiment of the present invention. The system includes a CPU 101 and a hardware accelerator. The hardware accelerator portion includes a decode stage 102 for receiving the Java bytecode from the memory. Decode stage 102 preferably uses instruction level parallelism in which more than one Java bytecode can be converted into a single native instruction. In a preferred embodiment, the system 100 includes a microcode stage 104 which receives signals from the decode stage 102 and is used to construct the native instructions. The microcode stage 104 allows for the production of multiple native instructions from a single bytecode. The reissue buffer 106 stores a copy of the converted instructions in the reissue buffer 106 as they are sent to the CPU 101.

The reissue buffer 106 monitors the native PC value 110. In a preferred embodiment, when the hardware accelerator is active, the hardware accelerator does not use the native PC value to determine the memory location to load the instructions from memory. The native PC value is instead maintained within a spoofed range which indicates that the hardware accelerator is active. In a preferred embodiment, the native PC monitor 110 detects whether the native PC value is within the spoofed range. If so, the multiplexer 112 sends the converted instructions from the hardware accelerator to the CPU 101. If not, the native instructions from memory are loaded to the CPU 101. When in the spoofed range, the addresses sourced to memory are the Java PC from the accelerator. Otherwise the native PC is sourced to memory.

If an interrupt occurs, the native PC value will go to a value outside the spoofed range. The PC monitor 110 will then stall the hardware accelerator. When a return from interrupt occurs, the CPU 101 will be flushed, and upon return from interrupt, the native PC value 108 returned to the PC value prior to the interrupt. The reissue buffer 106 will then reissue stored native instructions flushed from CPU 101 to the CPU 101 that corresponds to this prior native PC value. With the use of this system, the hardware accelerator does not need to be flushed upon an interrupt, nor do previously converted Java bytecodes need to be reloaded into the hardware accelerator. The use of the reissue buffer 106 can thus speed the operation and recovery from interrupt.

The CPU 101 is associated with a register file 113. This register file is the native CPU's normal register file, operably connected to the CPU's ALU but is shown separately here for illustration. The register file 113 stores Stack and Var values which can be used by the converted instructions. The Stack and Variable-managers 114 keep track of any information stored in the register file 113 and use it to help the microcode stage operations. As described below, in one embodiment there are a fixed number of registers used for Stack values and Variable value. For example, six registers can be used for the top six Stack values and six registers used for six Variable values.

In another embodiment of the present invention, the Stack and Variable manager assigns Stack and Variable values to different registers in the register file. An advantage of this alternate embodiment is that in some cases the Stack and Var values may switch due to an Invoke Call and such a switch can be more efficiently done in the Stack and Var manager 114 rather than producing a number of native instructions to implement this.

In one embodiment a number of important values can be stored in the hardware accelerator to aid in the operation of the system. These values stored in the hardware accelerator help improve the operation of the system, especially when the register files of the CPU are used to store portions of the Java stack.

The hardware accelerator preferably stores an indication of the top of the stack value. This top of the stack value aids in the loading of stack values from the memory. The top of the stack value is updated as instructions are converted from stack-based instructions to register-based instructions. When instruction level parallelism is used, each stack-bases instruction which is part of a single register-based instruction needs to be evaluated for its effects on the Java stack.

In one embodiment, an operand stack depth value is maintained in the hardware accelerator. This operand stack depth indicates the dynamic depth of the operand stack in the CPU's register files. Thus, if four stack values are stored in the register files, the stack depth indicator will read "4." Knowing the depth of the stack in the register file helps in the loading and storing of stack values in and out of the register files.

In a preferred embodiment, a minimum stack depth value and a maximum stack depth value are maintained within the hardware accelerator. The stack depth value is compared to the maximum and minimum stack depths. When the stack value goes below the minimum value, the hardware accelerator composes load instructions to load stack values from the memory into the register file of the CPU. When the stack depth goes above the maximum value, the hardware accelerator composes store instructions to store stack values back out to the memory.

In one embodiment, at least the top four (4) entries of the operand stack in the CPU register file operated as a ring buffer, the ring buffer maintained in the accelerator and operably connected to a overflow/underflow unit.

The hardware accelerator also preferably stores an indication of the operands and variables stored in the register file of the CPU. These indications allow the hardware accelerator to compose the converted register-based instructions from the incoming stack-based instructions.

The hardware accelerator also preferably stores an indication of the variable base and operand base in the memory. This allows for the composing of instructions to load and store variables and operands between the register file of the CPU and the memory. For example, When a Var is not available in the register file, the hardware issues load instructions. The hardware adapted to multiply the Var number by four and adding the Var base to produce the memory location of the Var. The instruction produced is based on knowledge that the Var base is in a temporary native CPU register. The Var number times four can be made available as the immediate field of the native instruction being composed, which may be a memory access instruction with the address being the content of the temporary register holding a pointer to the Vars base plus an immediate offset. Alternatively, the final memory location of the Var may be read by the CPU as an instruction saved by the accelerator and then the Var can be loaded.

In one embodiment, the hardware accelerator marks the variables as modified when updated by the execution of Java byte codes. The hardware accelerator can copy variables marked as modified to the system memory for some bytecodes.

In one embodiment, the hardware accelerator composes native instructions wherein the native instructions operands contains at least two native CPU register file references where the register file contents are the data for the operand stack and variables.

Figure 9:
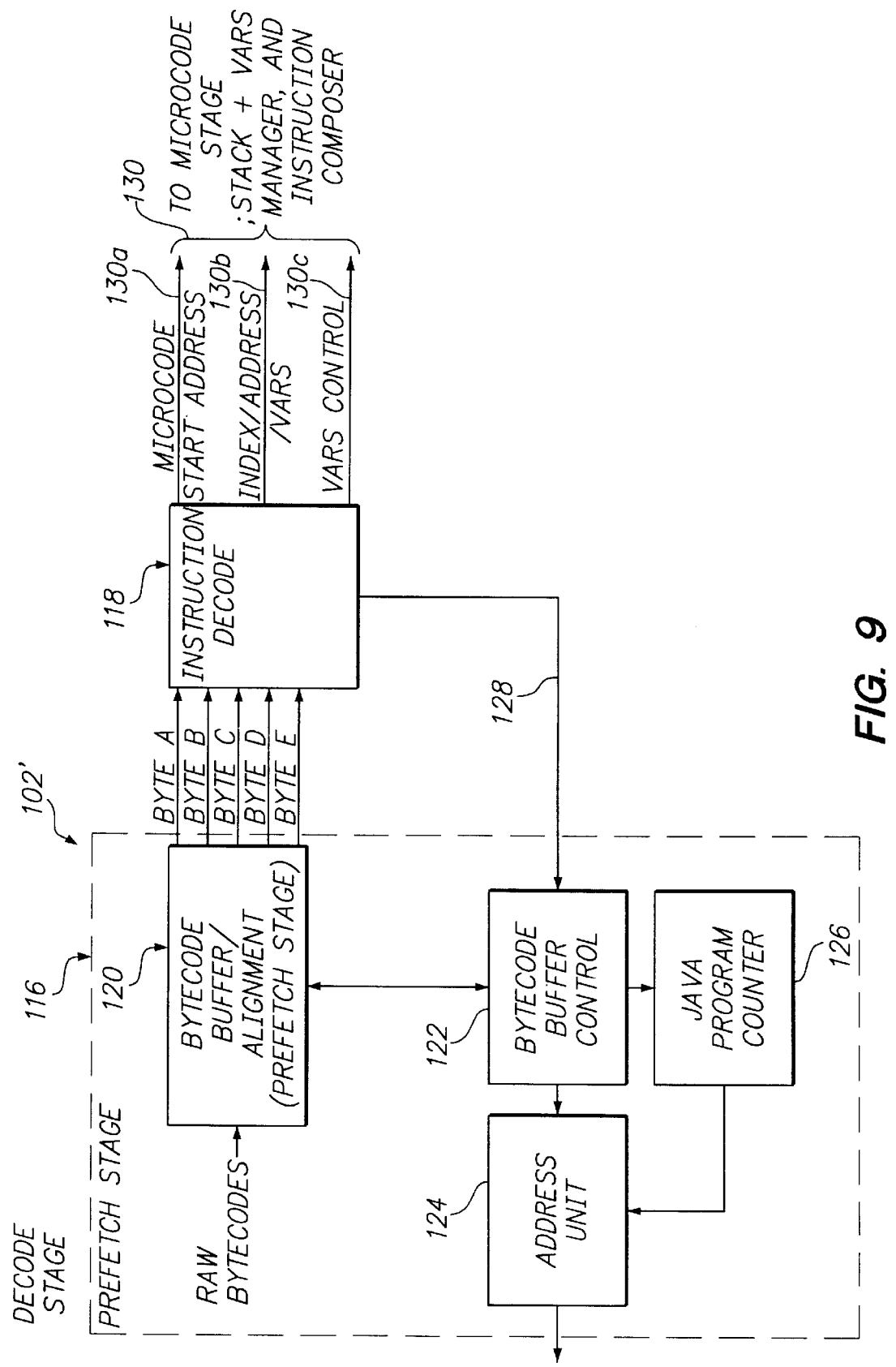
FIG. 9 is a diagram that illustrates the decode stage for use in the hardware accelerator of the parent invention.

FIG. 9 illustrates a decode stage of one embodiment of the present invention. This decode stage 102' is divided into the prefetch stage 116 and the instruction decode 118. The prefetch stage 116 includes a bytecode buffer and alignment prefetch stage unit 120 which receives the raw bytecodes from a memory (not shown). The Java bytecode buffer control element 122 provides instructions to determine when to load additional bytecodes from the memory. The address unit 124 uses the Java program counter 126 to determine the location of the next bytecode to load. As described above, while the hardware accelerator is active, the Java program counter is used to get the next word from memory containing Java bytecode. The native PC is maintained within a spoofed region and is not used to get the next instruction while the hardware accelerator is active. The bytecode buffer alignment unit 120 contains a number of bytecodes from the memory. When the instructions are passed on from the instruction decode unit 118, a number of bytes are removed from the bytecode buffer alignment unit 120. A signal on line 128 indicates the number of bytecodes which are used by the instruction decode unit 118. In one embodiment, the decoded data on line 130 is sent to the microcode stage. This data can include the microcode Start Address data 130*a*, Index/Address and Vars data 130*b*, and Var Control data 130*c*.

Figure 10:
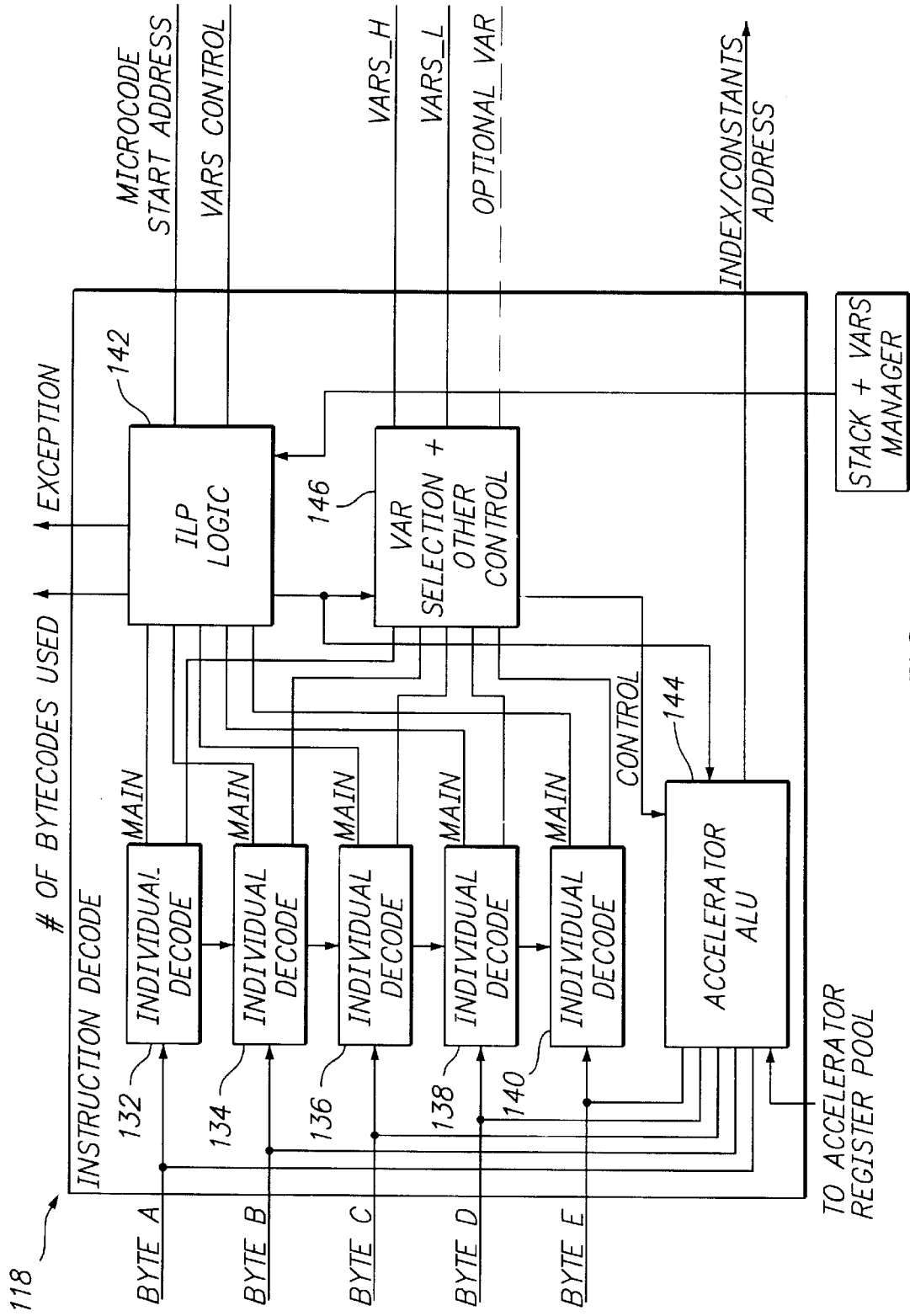
FIG. 10 is a diagram that illustrates one embodiment of an instruction decode unit used with the decode stage of FIG. 9.

FIG. 10 shows an instruction decode unit 118'. In this embodiment, a number of bytes are sent to an Instruction Decode unit. Individual Decode units 132, 134, 136, 138 and 140 receive and decode the bytes. Note that the value of adjacent bytes affects how the byte is decoded. For example, if byte A is the start of a two-byte instruction, the value of byte B is interpreted as the second half of the two-byte instruction. The instruction level parallelism logic 142 receives the decoded information and then determines the microcode start address for the primary byte-code. Secondary byte codes can be combined with the primary bytecode by the selection of registers accessed by the converted instruction. One example of this embodiment is described below with respect to FIGS. 19 and 20.

The accelerator ALU 144 is used to calculate index addresses and the like. The accelerator ALU is connected to the register pool. The use of the accelerator ALU allows certain simple calculations to be moved from the CPU unit to the hardware accelerator unit, and thus allows the Java bytecodes to be converted into fewer native instructions. The Variable Selection+Other Control unit 146 determines which registers are used as Vars. The Var control line from the ILP Logic unit 142 indicates how these Vars are interpreted. A Var and associated Var control line can be made available for each operand field in the native CPU's instruction.

In one embodiment, the hardware accelerator issues native load instructions when a variable is not present in the native CPU register file, the memory address being computed by the ALU in the hardware accelerator.

Figure 11:
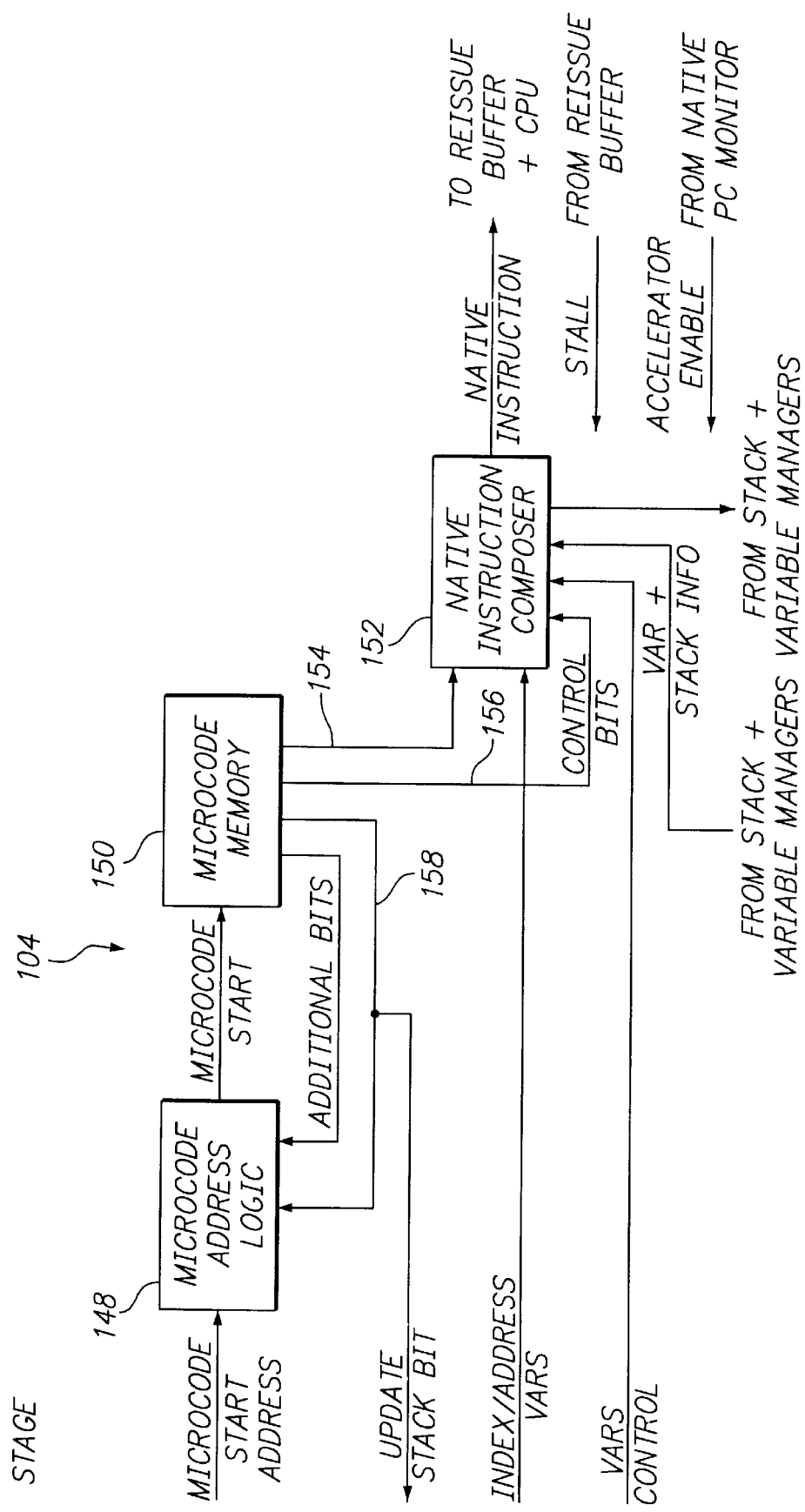
FIG. 11 is a diagram that illustrates one embodiment of a microcode stage for use with the embodiment of FIG. 8.

The microcode stage 104' shown in FIG. 11 includes a microcode address logic 148 and microcode memory 150. The microcode address logic sends microcode addresses to the microcode memory 150. The microcode memory 150 then sends the contents of that address to the Native Instruction Composer Logic 152 which produces the native instruction. Each microcode memory line includes a main instruction portion on line 154, control bits on line 156 and update stack pointer bits on line 158. Both the microcode address logic 148 and the microcode 150 can produce a string of native instructions until the update stack Bit is sent to the microcode address logic 148. At that point, the microcode address logic obtains another start address from the decode logic (not shown). The native instruction composer receives the main instruction portion on line 154, the control bits from the decode, the index address, Vars, and the Var controls. These inputs allow the native instruction composer 152 to construct the native instructions which are sent to the reissue buffer and the native CPU.

Figure 12:
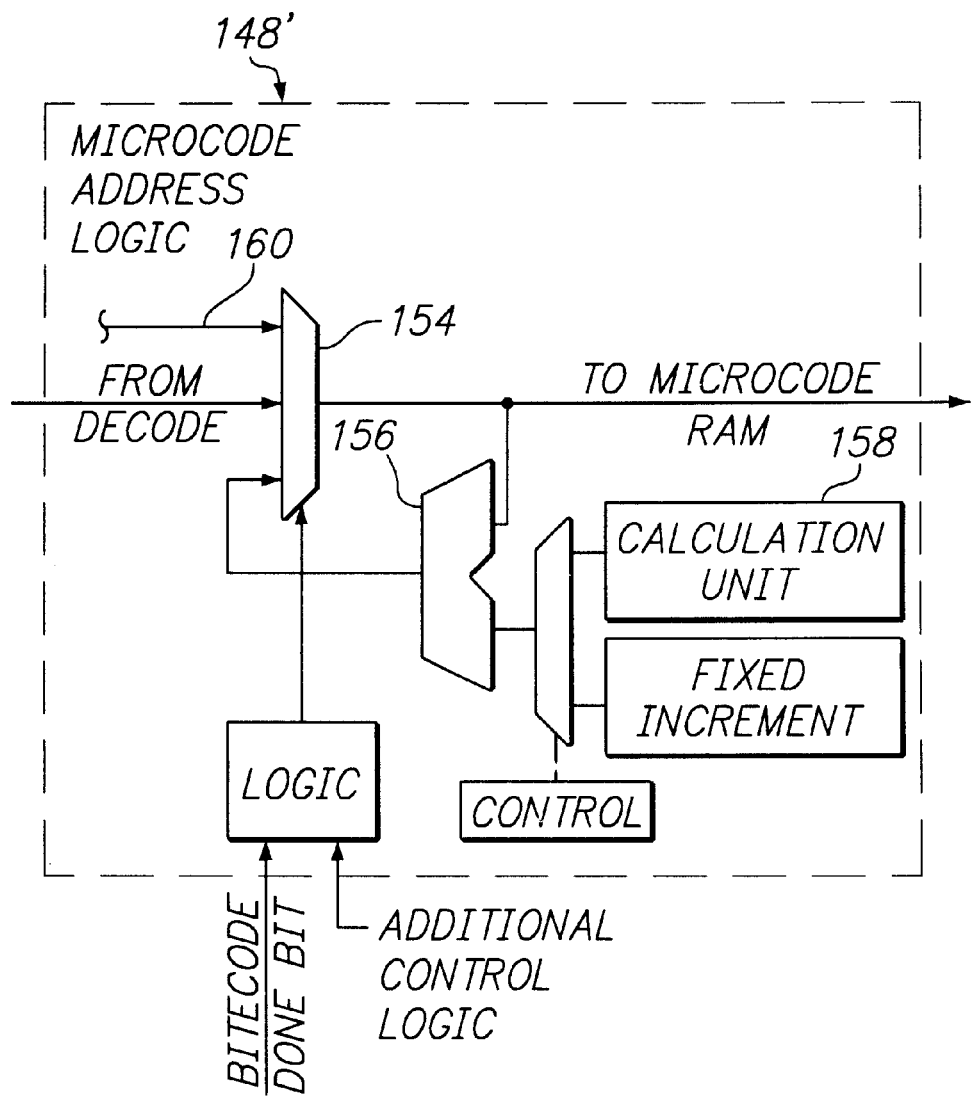
FIG. 12 is a diagram of a microcode address logic used with the microcode stage of FIG. 11.

FIG. 12 shows a microcode address logic 148' of one embodiment of the present invention. Start address coming from the decode logic goes to multiplexer 154. The multiplexer 154 can either send the start address or an incremental or calculated value to the microcode RAM. In a preferred embodiment, while the update stack bit is not set, the address of the next element in the microcode is calculated by the ALU 156 and provided to the multiplexer 154 for sending to the microcode memory (not shown). Space in the microcode RAM memory can be conserved by including jumps to other areas of the microcode memory. These jumps can be done by calculation in unit 158 or by providing the address on line 160.

Figure 13:
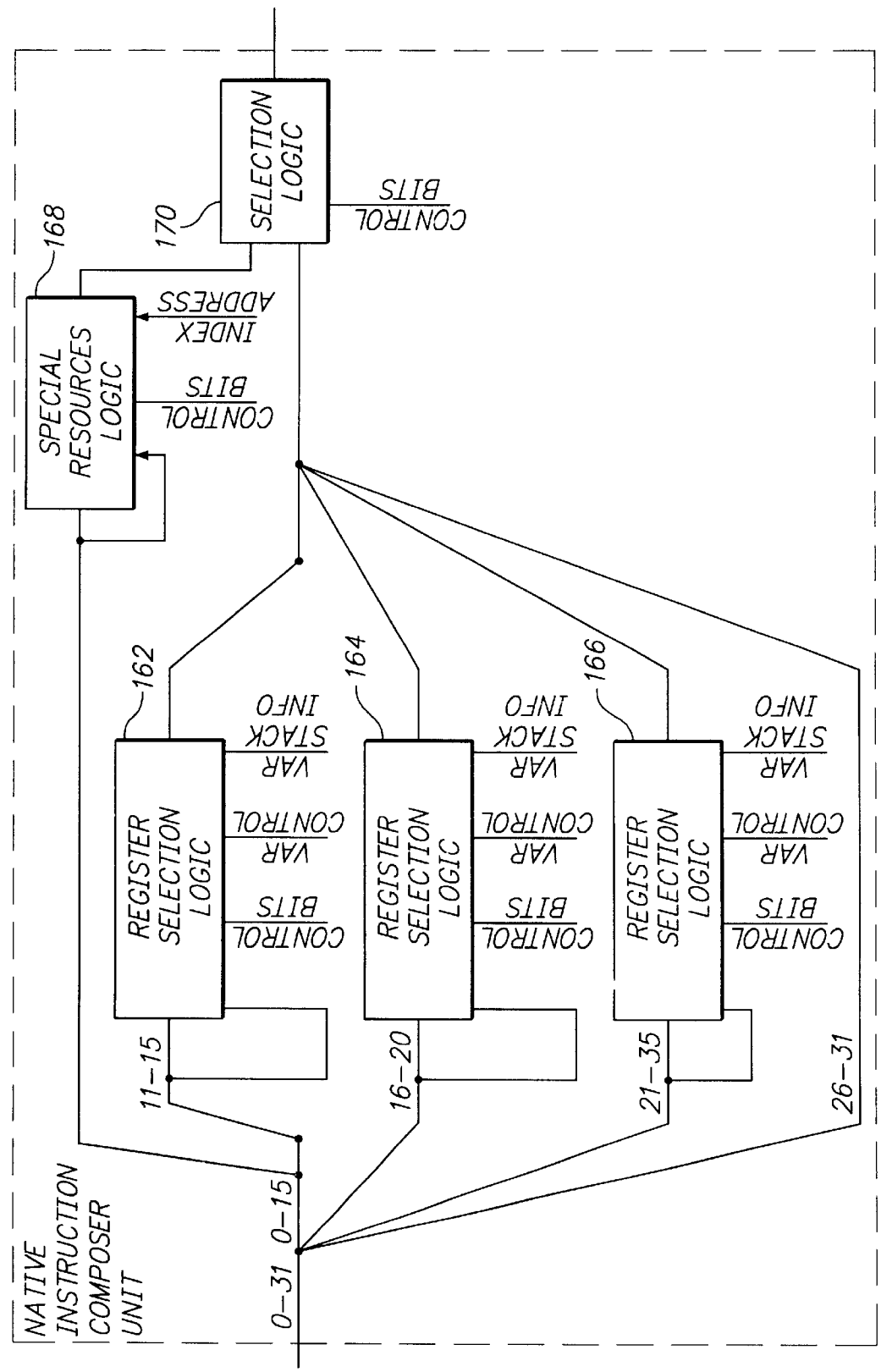
FIG. 13 is a diagram of a native instruction composer unit used with the embodiment of FIG. 11.

FIG. 13 illustrates an embodiment of a native instruction composer unit for use with the present invention. In this embodiment a number of register selection logic units 162, 164 and 166 are provided. Each register selection logic unit can be used to select a register used with a native instruction. Special resources logic unit 168 and selection logic 170 allow the selection of special instructions.

Figure 14:
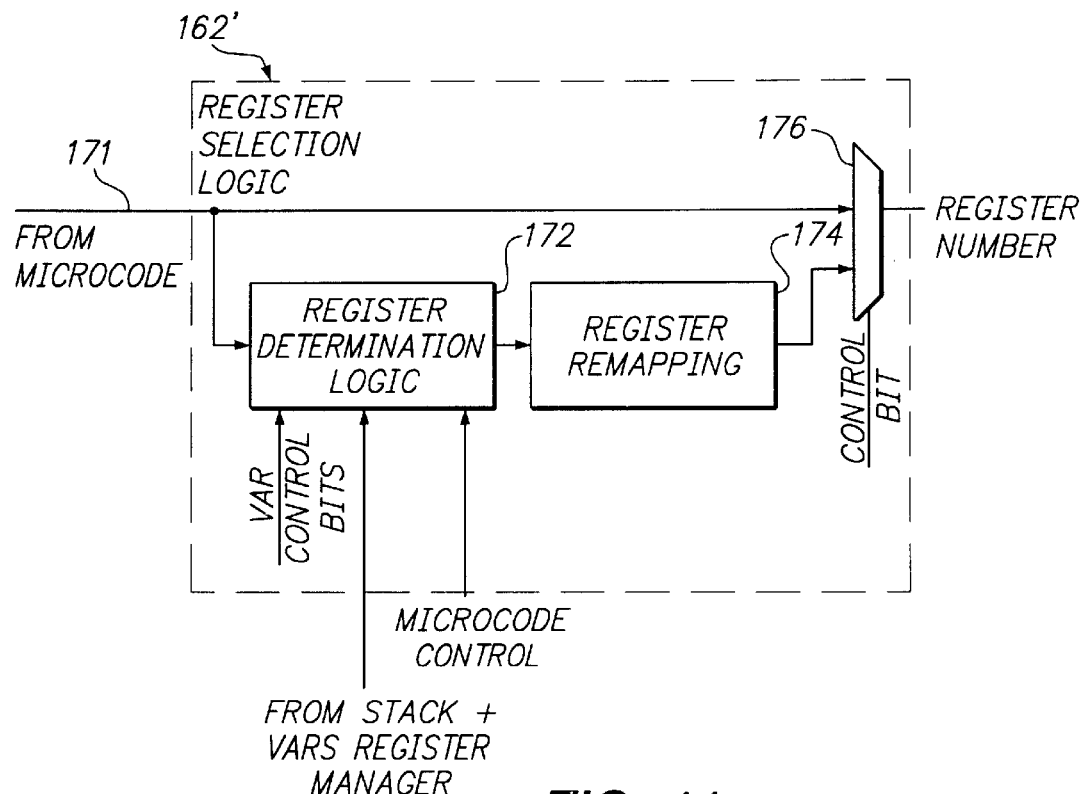
FIG. 14 is a diagram of a register selection logic used with the native instruction composer unit of FIG. 13.

FIG. 14 shows the register selection logic 161' of one embodiment of the present invention. The register determination logic 172 determines from the variable control bits, the microcode control bits and the Stack and Vars register manager information which register to use. For example, if the instruction is to load the top of stack and then use this top of stack value in next bytecode register determination logic 172 can be used to determine that register R10 contains the top of stack value and so Register R10 is used in the converted instruction.

Register remapping unit 174 does register remapping. In conventional CPUs, some registers are reserved. Register remapping unit 174 allows the decoder logic to assume that the Stack and Var registers are virtual, which simplifies the calculations. Multiplexer 176 allows the value on line 171 to be passed without being modified.

Figure 15:
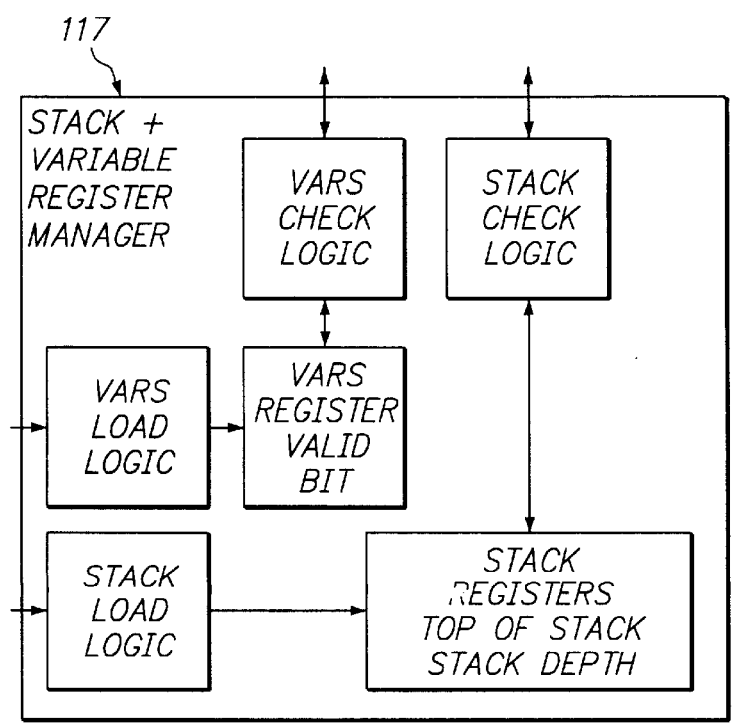
FIG. 15 illustrates a stack-and-variable-register manager of one embodiment of the parent invention.

FIG. 15 illustrates an embodiment of a stack-and-variable-register manager 114'. The stack-and-variable-register manager maintains indications of what is stored in the variable and stack registers of the register file of the CPU. This information is then provided to the decode stage and microcode stage in order to help in the decoding of the Java bytecode and generating appropriate native instructions.

In a preferred embodiment, one of the functions of the Stack-and-Var register manager is to maintain an indication of the top of the stack. Thus, if for example registers R1–R4 store the top 4 stack values from memory or by executing byte codes, the top of the stack will change as data is loaded into and out of the register file. Thus, register R2 can be the top of the stack and register R1 be the bottom of the stack in the register file. When a new data is loaded into the stack within the register file, the data will be loaded into register R3, which then becomes the new top of the stack, the bottom of the stack remains R1. With two more items loaded on the stack in the register file, the new top of stack in the register file will be R1 but first R1 will be written back to memory by the accelerators overflow/underlfow unit, and R2 will be the bottom of the partial stack in the CPU register file.

Figure 16:
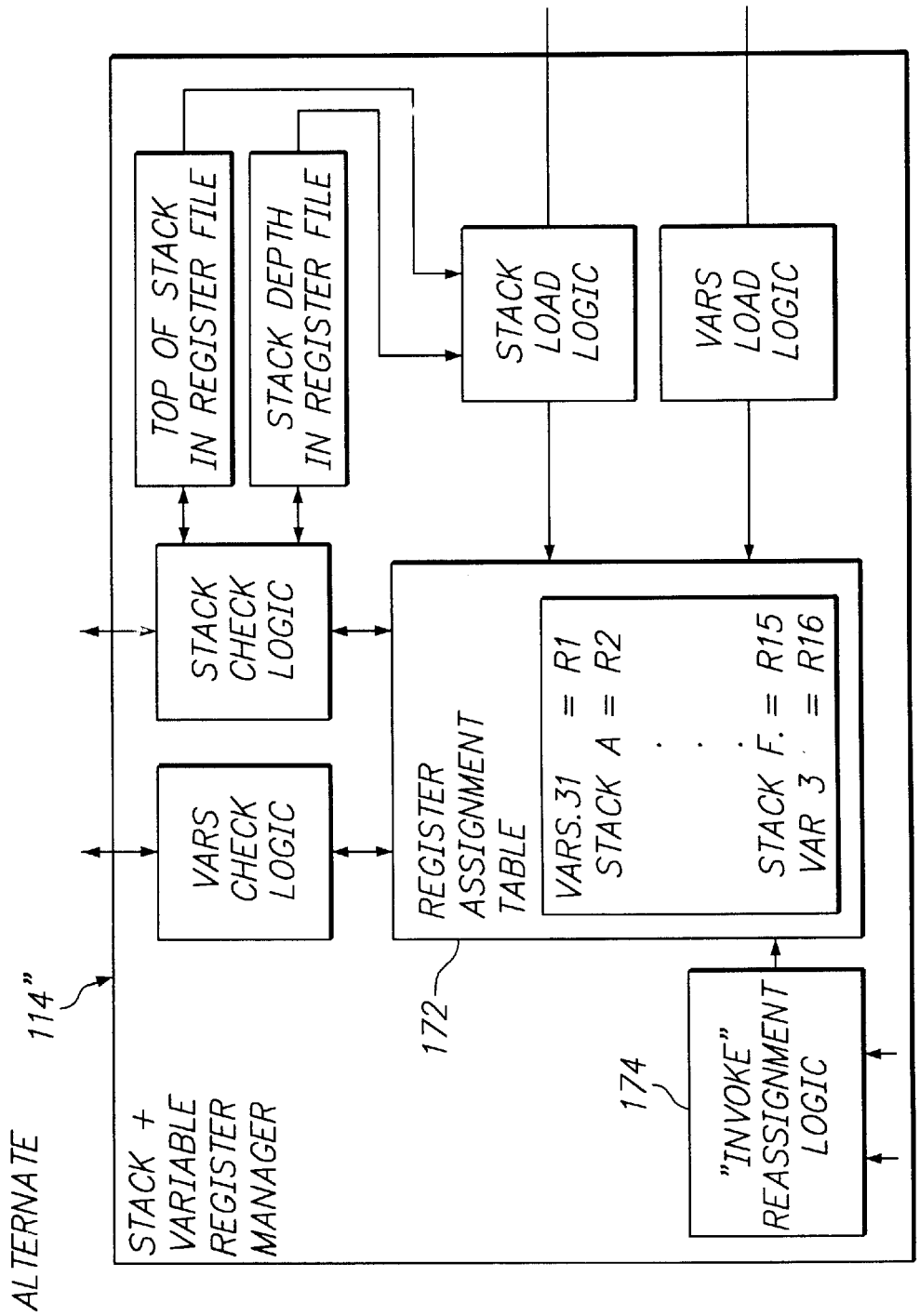
FIG. 16 illustrates a stack-and-variable-register manager of an alternate embodiment of the parent invention.

FIG. 16 illustrates an alternate stack-and-variable-register manager 114". In this alternate embodiment, a register assignment table 172 is maintained. The register assignment table maintains an indication of which Vars and stack variables are stored in which registers. When an instruction is decoded it is checked whether a Var or stack value is stored in the register file using the register assignment table 172. If there is a match to the incoming stack or Var value, the values within the register file of the CPU are used. If there is no match, the value can be loaded into the register file from the memory and the register assignment table updated. In one embodiment, an invoke assignment logic unit 174 is operably conected with the register assignment table. When an invoke occurs, typically the values of some of the stack and the Vars are switched. By reassigning the values within the register assignment table 172 using reassignment logic 174, the operation of the invoke can be speeded up.

Figure 17:
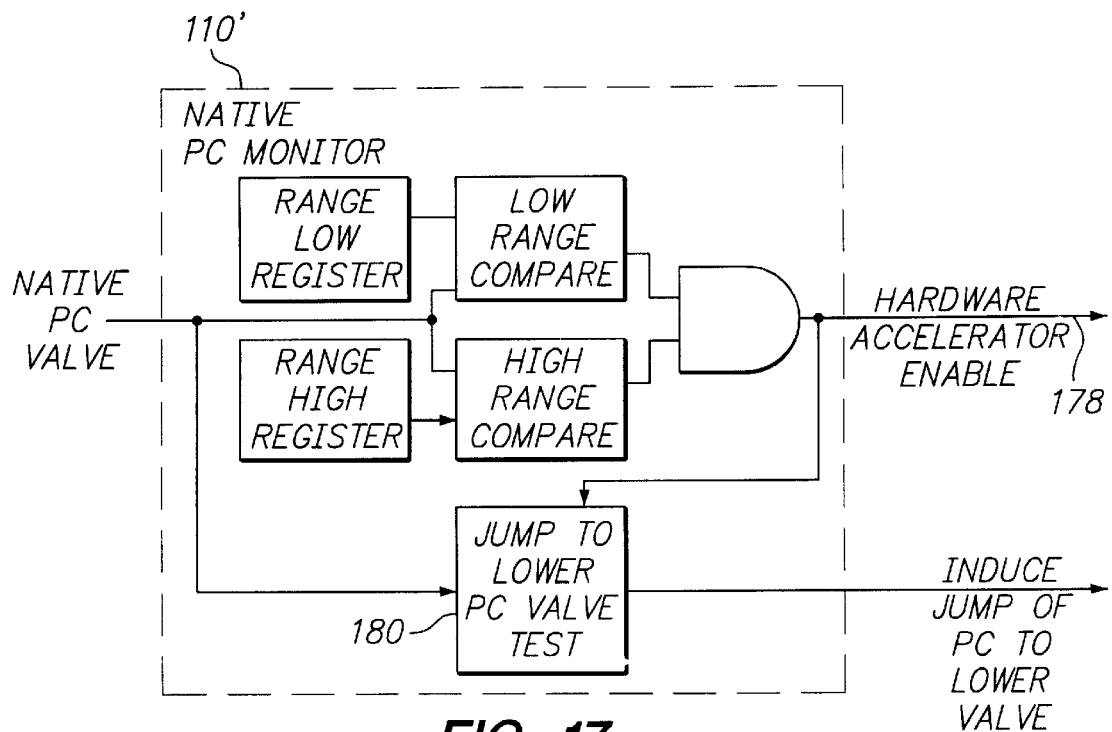
FIG. 17 is a diagram of the native PC monitor used with one embodiment of the parent invention.

FIG. 17 shows one embodiment of a native PC monitor 110'. The native PC value is compared to a high range register and a low range register. If the native PC value is within this range, the hardware accelerator is enabled using line 178. Otherwise the hardware accelerator is disabled. The element 180 tests whether the native PC value is coming close to the high end of the spoof range. If so, the system induces a jump to a lower value of the native PC unit.

Figure 18:
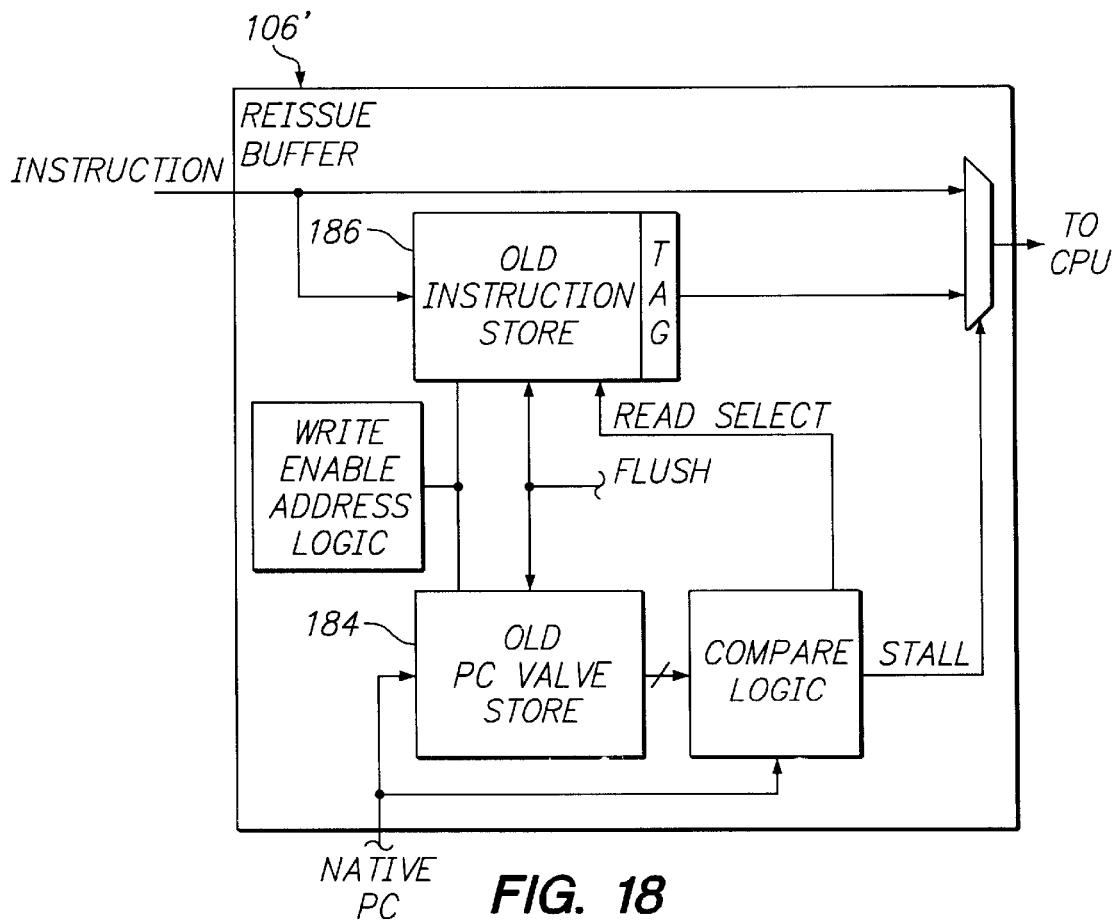
FIG. 18 is a diagram of a reissue buffer used with one embodiment of the parent invention.

FIG. 18 illustrates an embodiment of a reissue buffer 106'. The reissue buffer receives the converted instructions and stores them along with the associated native PC value. As long as there is no interrupt, the native PC value will continue to increment, and the next instruction and current native PC is stored in the reissue buffer and instruction issued to the CPU. When an interrupt occurs, the CPU pipeline is flushed, including non-executed instructions, of which there is a copy in the reissue buffer. When a return from an interrupt occurs, the CPU is flushed and the native PC value before the interrupt is restored. This restored native PC value matches a native PC stored in the PC value store 184, causing a buffered instruction in the old instruction store 186 to be provided to the CPU. The old instruction store and the PC value store are synchronized. Once all of the old instructions are provided to the CPU 102, the native PC value will be outside of the range of all of the old PC values in store 184, and new converted instructions will be provided. The depth of the reissue buffer depends upon the number of pipeline stages in the CPU 102 (not shown). Under certain conditions such as branches, the reissue buffer is flushed. As described above, the reissue buffer eases the operation of the hardware accelerator. The hardware accelerator need not know the details of the return from interrupt operation of the CPU. Thus the hardware accelerator can operate with a variety of different CPUs without requiring major modification of the hardware accelerator architecture. Changes to the microcode stage are sufficient to change the hardware accelerator so that it could be used with different CPUs.

Figure 19:
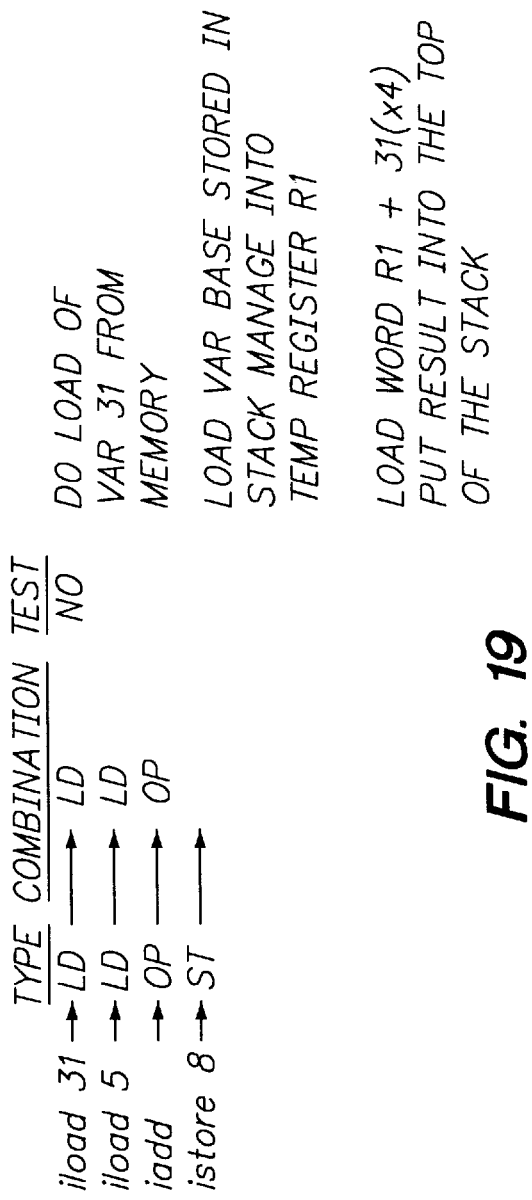
FIGS. 19 and 20 are diagrams that illustrate the operation of one embodiment of the parent invention.
Figure 20:
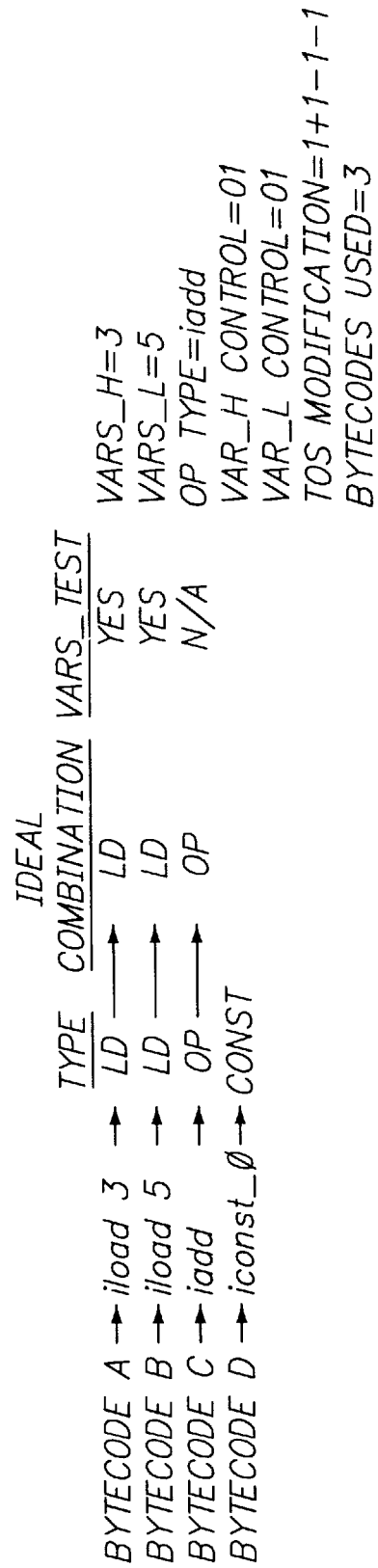

FIGS. 19 and 20 illustrate the operation of one embodiment of the system of the present invention. In FIG. 19, multiple instructions are shown being received by the decoder stage. The top two instructions are integer loads and the bottom instruction is an integer add. The ideal combination of these bytecodes by the system would be the main op code being an add and the two loads combined together. The system tests whether each of the Vars is in memory. In this example, the iload 31 is not a Var which is stored in memory. Thus the value of the Var 31 needs to be loaded from memory into a free register. In this example, the Var base stored in the stack manager is loaded into temp register R10. The word is put into the top of the stack, or in this case in the register file indicating the top of the stack.

FIG. 20 illustrates an example when iload_3 and iload 5 are used. In this example, both of these Vars are stored within the register file. Thus, the add can be combined with the two loads. In this example, Var H is indicated as being a 3, Var L is indicated as being a 5. The op type is indicated as being iadd. The Var H Control and Var L Control indicate that the Vars are load types and in the register file. The top of the stack modification is +1. This is because two values are loaded upon the stack for the two loads, and one value is removed from the stack as a result of the main add operation.

In actuality, as can be understood with respect to the figures described above, the Var 3 and Var 5 are already stored within the two register files. The value of these register files is determined by the system. The instructions iload 3, iload 5 and iadd are done by determining which two registers store Var 3 and Var 5 and also determining which register is to store the new top of the stack. If Var 3 is stored in register R9 and Var 5 is stored in register R11 and the top of the stack is to be stored in register R2, the converted native instruction is an add of the value within register R9 to the value within register R11 and store the value into register R2. This native instruction thus does the operation of three bytecodes at the same time, resulting in the instruction level parallelism as operated on a native CPU.

Additionally within the hardware accelerator a ALU is deployed where the decoded byte code instructions for bytecodes such as GOTO and GOTO_W, the immediate branch offset following the bytecode instruction is sign extended and added to the Java PC of the current bytecode instruction and the result is stored in the Java PC register. JSR and JSR_W bytecode instructions also do this in addition to pushing the Java PC of the next byte code instruction on the operand stack.

The Java PC is incremented by a value calculated by the hardware accelerator. This increment value is based on the number of bytes being disposed of during the current decode which may include more than one byte code due to ILP. Similarly, SiPush and BiPush instructions are also sign extended and made available in the immediate field of the native instruction being composed. In some processors, the immediate field of the native instruction has a smaller bit width than is desired for the offsets or sign extended constants so this data may be read as memory mapped or I/O mapped reads.

Figure 21:
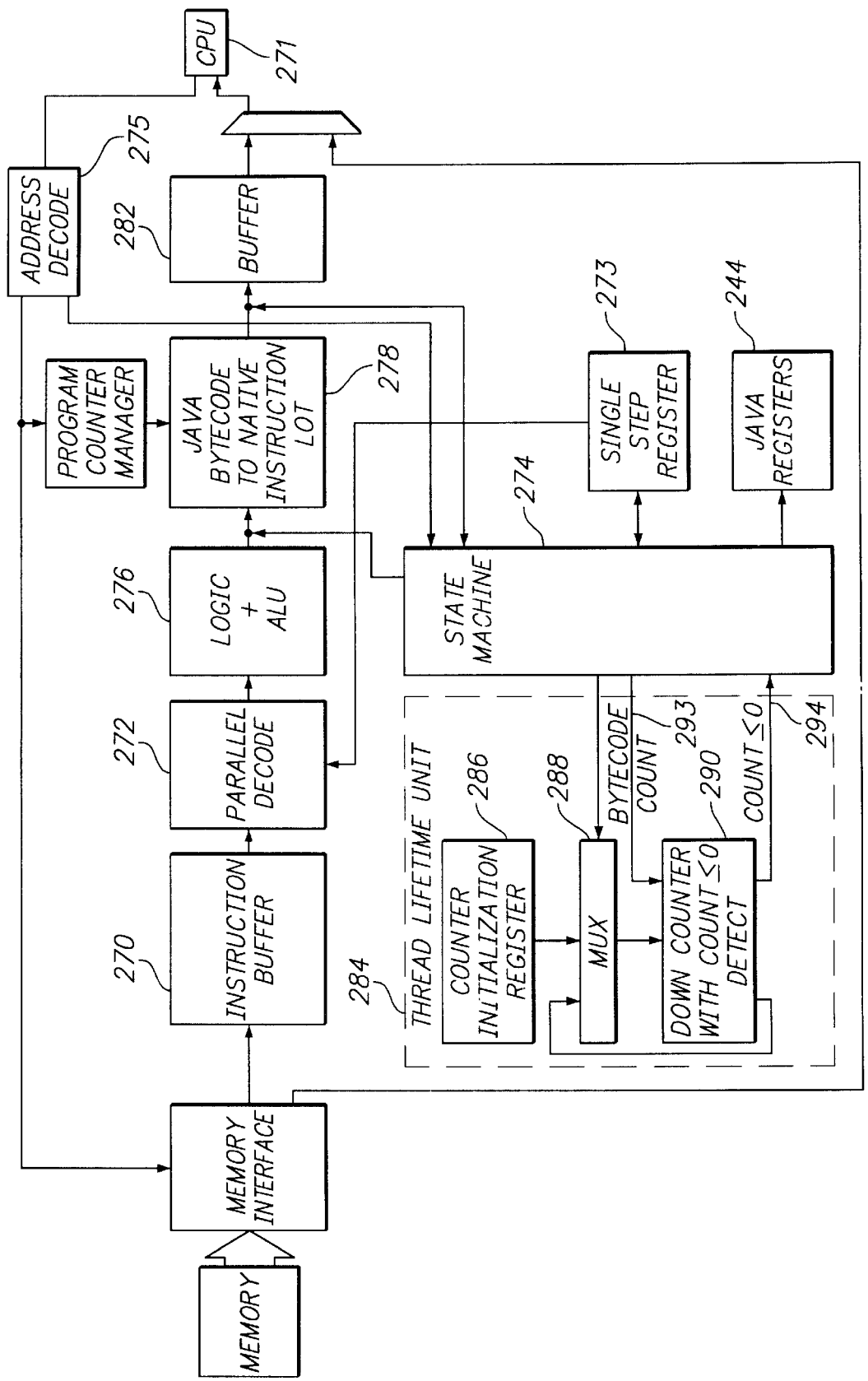
FIG. 21 is a diagram illustrating the hardware unit of the present invention including the thread lifetime unit.

FIG. 21 shows an example of a hardware unit with a thread lifetime unit 284. The Java hardware accelerator has the ability to limit the number of bytecodes that a thread can execute before it must give up control of the accelerator. This allows the green thread" support without requiring the threads be well behaved. In a preferred embodiment, thread lifetime unit 284 is used. The Counter Initialization Register 286 is loaded (preferably by CPU 271) with the number of Java bytecodes that the thread will be allowed to execute before control passes back to the Java Virtual Machine. In an alternate embodiment, other elements such as the bytes of the instruction stream or the branches are tracked. The state machine 274 detects when register 286 contains a valid value. For example, the state machine can detect a non-zero load by the CPU, or detect that register 286 has a non-zero value. In an alternate embodiment, register 286 is one of the registers in the Java Registers 244. When state machine 274 begins processing Java bytecodes and register 286 has a valid value, the value in register is used to initialize down counter 290 via multiplexer 288. Multiplexer 288 otherwise feeds back the decremented value from the down counter 290. Other counter structures can also be used. The Java hardware accelerator then processes Java bytecodes as normal, with the addition that for each Java bytecode, or group of bytecodes for folded cases (instruction level parallelism), state machine 274 causes the down counter 290 to decrement the count by the number of bytecodes processed this cycle. The count is passed to the down counter 290 over bus 293. When the down counter's count gets to zero or below, line 294 is asserted to inform the state machine 274 that the processing of additional bytecodes should stop and control should be passed back to the Java Virtual Machine in the CPU.

In the case of a callback from the thread manager to the Java thread, the counter value remains unchanged when the Java Virtual Machine on the CPU is processing the callback. If the callback results in the current thread continuing, the CPU will either tell the Java hardware accelerator to resume from the callback, using the existing count or, in an alternate embodiment, read the contents of the down counter and write it into register 286. Alternatively a reload path from the output of the down counter into register 286 is used. If the callback requires a context switch, in a preferred embodiment the CPU will copy the state from the Java hardware accelerator, including the remaining count in the down counter, into a holding area associated with the thread. The next time this thread is invoked the Java Virtual Machine has the option of using the count remaining from the last time this thread ran or using a new count.

In one embodiment, the down counter 290 is a countdown-by-one-only counter, in which case for folded bytecodes the counter is "pulsed" once per bytecode(i.e. 3 bytecodes folded into one issue requires 3 pulses of the down counter). An additional method of determining when register 286 is valid is to use a separate "use green thread hardware" flag which takes the place of the methods mentioned above. The counter structure 284 of an alternate embodiment counts other elements than bytecodes such as number of instruction bytes read, or number of callbacks, etc. Register 286 and multiplexer 288 can be combined into the functionality of the down counter 290, in which case the down counter just starts with whatever value it has been loaded with.

There are three common implementations of the green threads. In one implementation, the bytecode count for each active thread is maintained constant. For this case, every time the thread is loaded into the hardware unit, the same constant value is implemented in the decrementing counter. In another embodiment, each time a thread is loaded in, information concerning the bytecode amount is obtained from data stored by the green thread manager of the Java Virtual Machine. In the third example, each thread has a priority and an associated bytecode count where that bytecode count is dependent upon the priority. Each priority has a predetermined number of bytecodes to be executed in the active thread. The conversion of the priority to the bytecode count can be done in the software or hardware.

Figure 22:
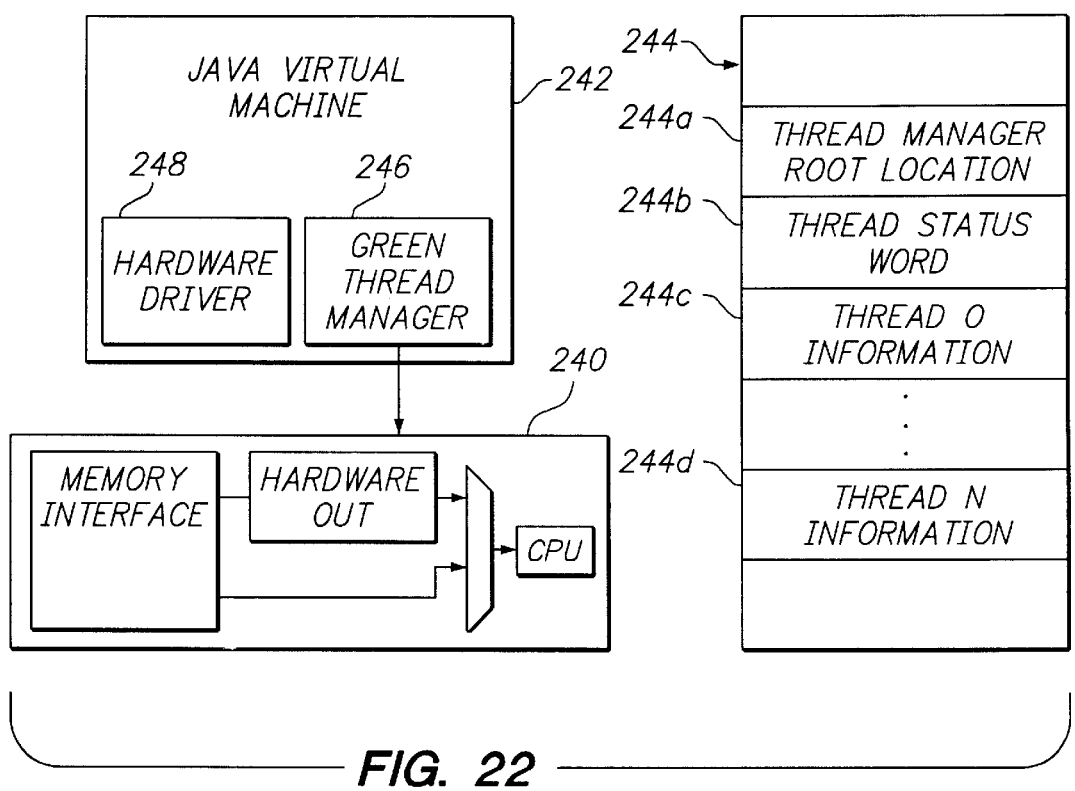
FIG. 22 is a diagram that illustrates the interaction between the Java Virtual Machine and thread data and the hardware accelerated system of the present invention.

FIG. 22 illustrates the system 240, the Java Virtual Machine 242 and the thread information in memory 244. The Java Virtual Machine 242 includes green thread manager 246 and a hardware driver 248 which is designed to implement the hardware accelerator system of 240. The hardware driver 248 is used to control interactions between the system 240 and the rest of the Java Virtual Machine 242. The Java Virtual Machine thread manager 246 interacts with the memory 244 which stores the information for the thread. This information can include the thread manager root location 244a which is the first location of the thread information in memory, and thread status word 244b which can indicate by bits which threads are active in the system, as well as indicating which thread is active loaded into the system 240.

Associated with the system is also a number of thread information blocks including thread information block 244c for the thread 0 and thread information block 244d for the thread n. The thread information blocks stored in memory can include a pointer to the program code, priority information, security information, stack pointers, and data. Once an active thread in the system 240 is finished operating, as indicated by the thread lifetime unit in the hardware unit, an indication is provided to the green thread manager 246 of the Java Virtual Machine 242. Once the Java Virtual Machine 242 is loaded into the CPU of the system 240, the green thread manager causes the system to determine which thread should be loaded next into the CPU. Once this is determined, this information, as well as any byte count information, is provide to the system 240, and the system 240 can then implement the active thread loaded into system 240.

Note that as described above, in the system of the present invention, the hardware unit can be a part of the CPU or can be separate from the CPU.

Figures 23, 23A:
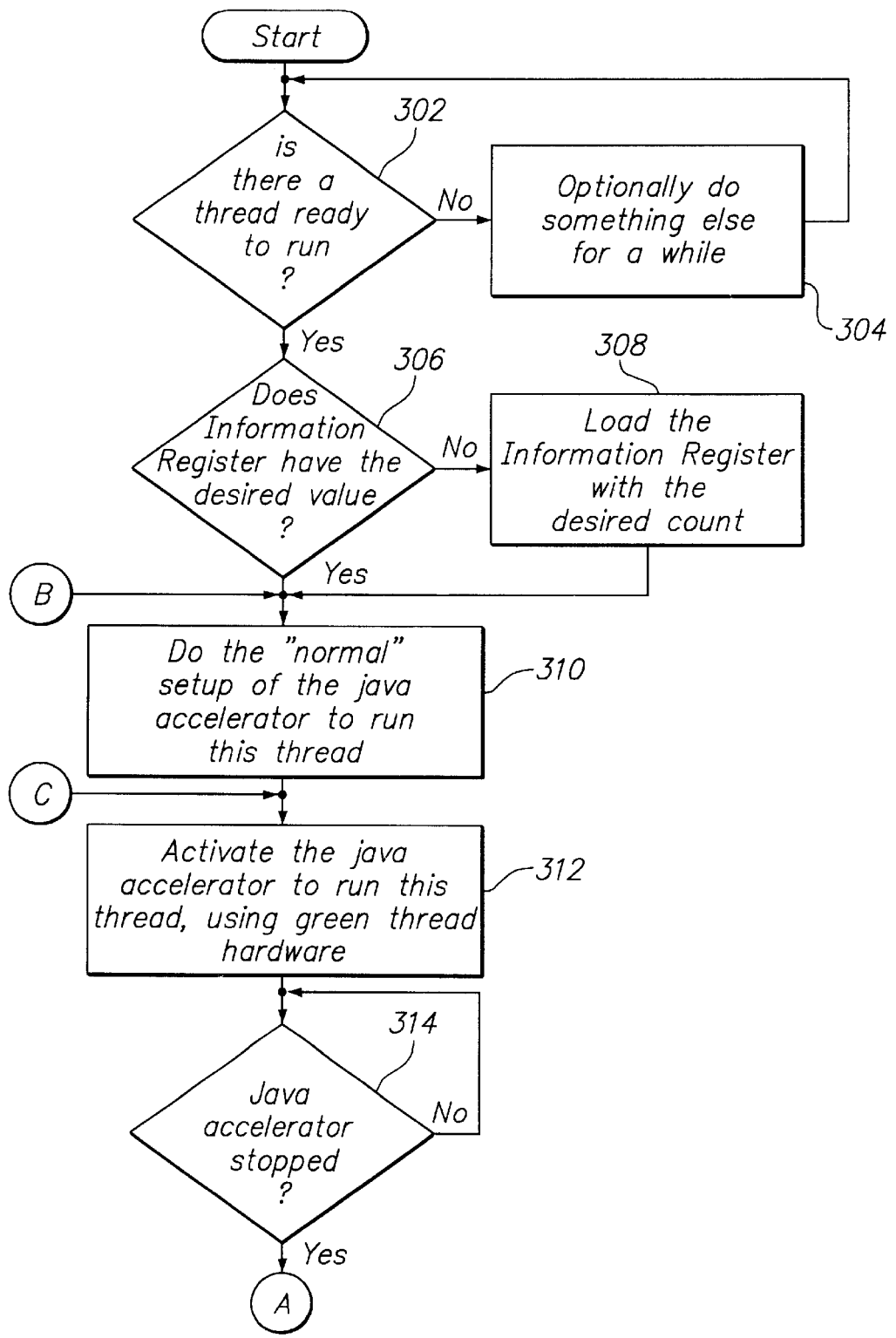
FIG. 23 illustrates a flow chart of the green thread operation in one embodiment of the present invention.
Figure 23B:
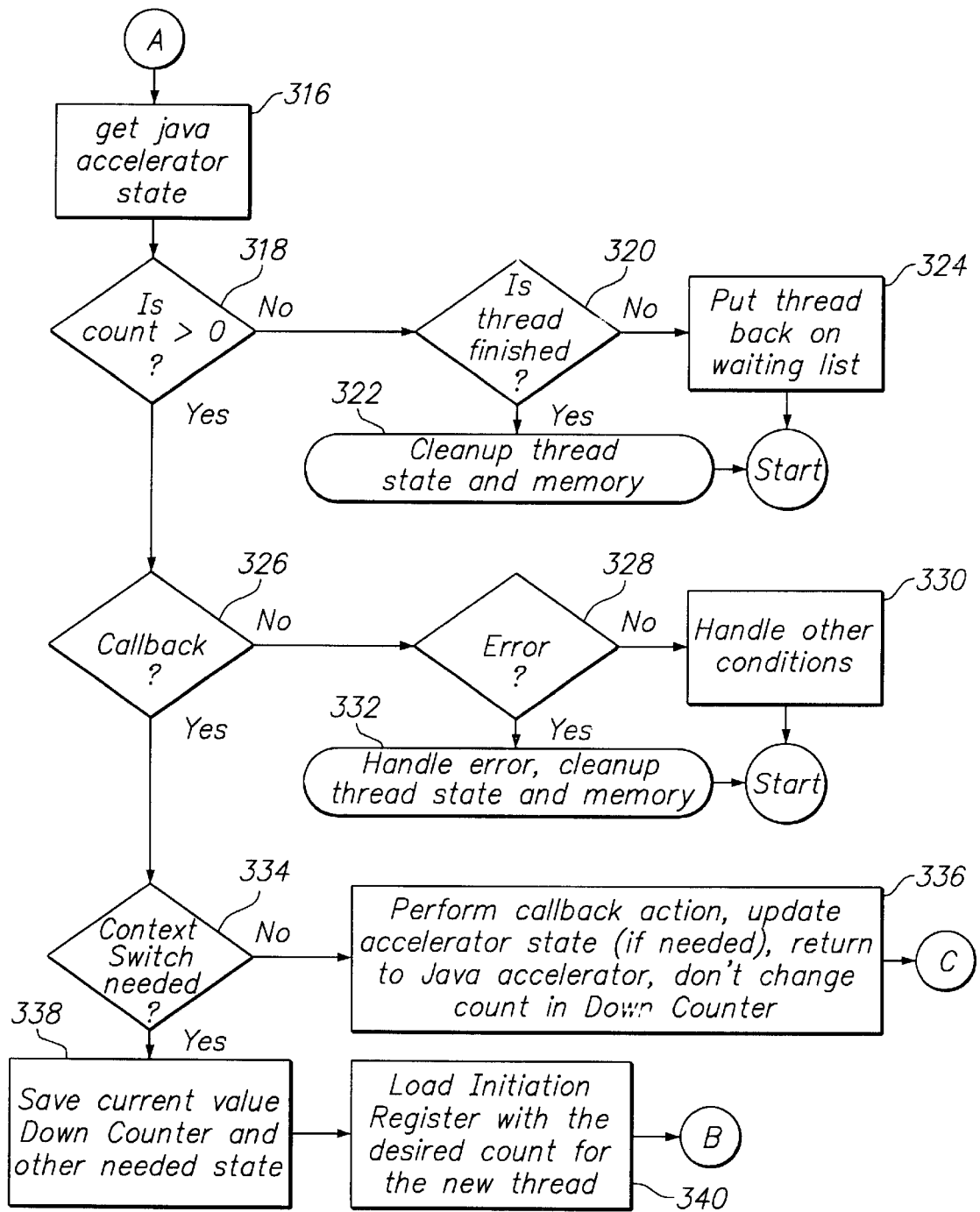

FIG. 23 illustrates a flow chart of the green thread operation in one embodiment of the present invention. In decision block 302, it is determined whether there is a thread available to run. If not, in step 304, something else is done until a thread is available. If a thread is available, the flow chart goes into step 306, which checks whether an initiation register has a desired value. If not, the initiation register is loaded with the desired element count in step 308. As discussed above, this count preferably counts the number of bytecodes but can also, in a less preferred embodiment, indicate the number of bytes of instructions. When the desired value is loaded into the register in step 310, the normal setup of the Java accelerator is done in order to run the thread. In step 312, the Java accelerator is activated to run the thread using the green thread hardware such as a thread lifetime unit 284 shown in FIG. 213. Looking again at FIG. 234, step 314 determines whether the Java accelerator is stopped. When the Java accelerator stops, the Java accelerator state is obtained in step 316. If the count in the counter is not greater than zero, meaning that the number of bytecodes or bytes allocated for the thread is finished, then in block 320 it is checked whether the thread is finished. If so, in step 322, the cleanup of the thread and the state and the memory are done. If the thread is not finished, in step 324, the thread is put back onto the waiting list of the Java Virtual Machine's green thread manager. As described above, the Java Virtual Machine green thread manager decides what is the next thread to operate on and the system is again started. If the count is greater than zero, in block 326 it is checked whether a callback occurs. In step 328, it is checked whether an error has occurred. If not, the other conditions are handled in step 330. If so, in step 332, the error is handled and the cleanup of the thread state and memory is done in step 322. If a callback has occurred, in step 334 it is checked whether a contact switch is needed. If not, in step 336 the callback action is performed and the updating of the accelerator, if needed, is done. It is returned to the Java accelerator after the callback action and the count within the bytecode count register where the counter as shown in the thread lifetime unit 284 of FIG. 21 is not modified. If a context switch is needed, in step 338 the current value of the counter and other state information is stored, and in step 340 the initiation register is loaded with the desired count for the new thread.

Another embodiment of the present invention concerns a debugger system. The debugger system can be implemented by having a single-stop operation of the hardware unit. In the single-step operation of the hardware unit, after each operation of a register-based instruction, the hardware unit can be stopped and the registers of the hardware unit examined to debug either the program or the system itself. In one embodiment, the information stored in the CPU registers such as the operand stack and the like can be loaded back out to the memory after each instruction, in order to debug the system using the external memory. Alternately, a native instruction such as a soft interrupt can be sent to the CPU.

FIG. 21 shows an embodiment wherein a single-step register 273 is used as part of the single-step unit. The single-step unit allows for a debugger indication to be produced after each stack-based instruction. In a preferred embodiment, the single-step unit register 273 is implemented as a single bit of a control word. In one embodiment, when the single-step register 273 indicates that single-step operation is to occur, after each bytecode is translated into a native instruction or instructions, a debugger indication is produced, preferably by state machine 274, indicating to the unit 278 to produce a native debugger instruction. In a preferred embodiment a soft interrupt is used. The soft interrupt pauses the CPU to save the information required to debug the software.

One twist to the system is that for some instructions such as a branch or other control flow instructions can allow the CPU to never reach a soft interrupt placed after the translated native instructions. In particular, when a bytecode is converted to multiple register-based instructions, the last instruction in the group is often never reached by the CPU. For these reasons, the address decode unit 275 checks the CPU program counter value to determine when a jump occurs and produces an indication to the state machine 274. The state machine 274 can then produce a debugger indication by producing a soft interrupt for the CPU before the register-based instruction(s) of the bytecode of the jumped to address is sent to the CPU.

Additionally, note that the state machine 274 preferably inhibits bytecode folding into a single register-based instruction by the parallel decode unit 272 when single-step operation occurs. This allows a soft breakpoint after each bytecode. The soft interrupts produced after each bytecode rather than after each native instruction allow for Java-oriented debugging. Soft interrupts after each register-based instruction would make Java-oriented debugging much more difficult. In an alternate embodiment, bytecode folding is not inhibited and when bytecode folding occurs there is not a debugger indication after each bytecode.

Note that the system of the present invention can be used with a variety of debugging methods. Counters and Java PC comparitors can be used to produce more complex debugging indications as well.

While the present invention has been described with reference to the above embodiments, this description of the preferred embodiments and methods is not meant to be construed in a limiting sense. For example, the term Java in the specification or claims should be construed to cover successor programming languages or other programming languages using basic Java concepts (the use of generic instructions, such as bytecodes, to indicate the operation of a virtual machine). It should also be understood that all aspects of the present invention are not to be limited to the specific descriptions, or to configurations set forth herein. Some modifications in form and detail the various embodiments of the disclosed invention, as well as other variations in the present invention, will be apparent to a person skilled in the art upon reference to the present disclosure. It is therefore contemplated that the following claims will cover any such modifications or variations of the described embodiment as falling within the true spirit and scope of the present invention.

What is claimed is:

1. A system comprising:
    a first unit adapted to execute register-based instructions; and
    a hardware unit associated with the first unit, the hardware unit adapted to convert stack-based instructions into register-based instructions, the hardware unit including a thread lifetime unit which determines when a thread loaded into the system should be loaded out of the system.

2. The system of claim 1, wherein the thread lifetime unit maintains an indication of the number of elements that remain to be executed in an active thread.

3. The system of claim 2, wherein the indication indicates the number of bytecodes that remain to be executed in an active thread.

4. The system of claim 2, wherein the indication indicates the number of bytes that remain to be executed in an active thread.

5. The system of claim 2, wherein the indication is stored in a counter.

6. The system of claim 5, wherein the counter is a decrementing counter.

7. The system of claim 1, wherein a register in the hardware unit stores the number of elements assigned to an active thread loaded into the system.

8. The system of claim 1, wherein the threads are controlled by a Java Virtual Machine.

9. The system of claim 8, wherein the number of elements assigned to an active thread loaded into the system is obtained from the Java Virtual Machine.

10. The system of claim 8, wherein the Java Virtual Machine includes a driver for the system.

11. The system of claim 8, wherein the threads controlled by the Java Virtual Machine are green threads.

12. The system of claim 1, wherein the first unit comprises a CPU.

13. The system of claim 1, wherein the CPU does not include the hardware unit.

14. The system of claim 1, wherein the first unit comprises a CPU and the hardware unit is a hardware subunit within the CPU.

15. The system of claim 1, wherein the thread lifetime unit on the hardware unit includes a counter connected to a multiplexer as well as a counter initialization register also connected to the multiplexer, the output of the multiplexer going to provide the value for the counter.

16. A system comprising:
    a first unit adapted to execute register-based instructions; and
    a hardware unit associated with the first unit, the hardware unit adapted to convert stack-based instructions into register-based instructions, the hardware unit further adapted to maintain an indication of the number of elements that remain to be operated on for an active thread in the system, the hardware unit using the indication to determine when to halt operation on the thread.

17. The system of claim 16, wherein the indication is stored in a thread lifetime unit.

18. The system of claim 16, wherein the thread lifetime unit on the hardware unit includes a counter connected to a multiplexer as well as a counter initialization register also connected to the multiplexer, the output of the multiplexer going to provide the value for the counter.

19. The system of claim 16, wherein the indication indicates the number of bytecodes that remain to be executed in an active thread.

20. The system of claim 16, wherein the indication indicates the number of bytes that remain to be executed in an active thread.

21. The system of claim 16, wherein the indication is maintained in a counter.

22. The system of claim 21, wherein the counter is a decrementing counter.

23. The system of claim 16, wherein a register in the hardware unit stores the number of elements assigned to an active thread loaded into the system.

24. The system of claim 23, wherein the number of elements assigned to the active thread is obtained from a Java Virtual Machine.

25. The system of claim 16, wherein the thread is controlled by a Java Virtual Machine.

26. The system of claim 25, wherein the Java Virtual Machine includes a driver for the system.

27. The system of claim 25, wherein the threads are green threads controlled by the Java Virtual Machine.

28. The system of claim 16 wherein the first unit comprises a CPU.

29. The system of claim 28, wherein the CPU does not include the hardware unit.

30. The system of claim 16, wherein the first unit comprises a CPU and the hardware unit is a hardware subunit within the CPU.

31. A Java Virtual Machine including:

a hardware driver for a chip, the chip containing a first unit used to execute register-based instructions and a hardware unit used to convert stack-based instructions to register-based instructions, wherein the hardware driver provides an indication of the number of elements to execute for a thread to a register in the hardware unit.

32. The Java Virtual Machine of claim 31, wherein the indication indicates a number of bytecodes.

33. The Java Virtual Machine of claim 31, wherein the indication indicates a number of bytes.

34. The Java Virtual Machine of claim 31, wherein the thread is a green thread controlled by the Java Virtual Machine.

35. A system comprising:

a first unit adapted to execute register-based instructions; and a hardware unit associated with the first unit, the hardware unit adapted to convert stack-based instructions into register-based instructions, the hardware unit including a green thread counter which is used to determines when a thread loaded into the system should be loaded out of the system.

36. The system of claim 35, wherein the green thread counter is a down counter.

37. The system of claim 35, wherein the green thread counter is loaded from a register.

38. A system comprising:

a first unit adapted to execute register-based instructions; and a hardware unit associated with the first unit, the hardware unit adapted to convert stack-based instructions into register-based instructions, the hardware unit including a single step unit that allows for debugger indications to be produced after each stack-based instruction.

39. The system of claim 38, wherein the debugger indication is a native instruction sent to the CPU first unit.

40. The system of claim 39, wherein the native instruction is a soft interrupt instruction.

41. The system of claim 38, wherein the hardware unit can combine multiple stack-based instructions into a single register-based instruction and this ability is switched off during single-step operation.

* * * * *